(12) United States Patent
Fukumori et al.

(10) Patent No.: US 9,303,726 B2
(45) Date of Patent: Apr. 5, 2016

(54) BICYCLE CHAIN

(71) Applicant: SHIMANO INC., Sakai (JP)

(72) Inventors: Tsuyoshi Fukumori, Sakai (JP); Koji Tokuyama, Sakai (JP); Emi Hatanaka, Sakai (JP)

(73) Assignee: SHIMANO INC., Sakai (JP)

( * ) Notice: Subject to any disclaimer, the term of this patent is extended or adjusted under 35 U.S.C. 154(b) by 348 days.

(21) Appl. No.: 14/039,051

(22) Filed: Sep. 27, 2013

(65) Prior Publication Data
US 2015/0094181 A1     Apr. 2, 2015

(51) Int. Cl.
*F16G 13/06* (2006.01)
*B62M 9/00* (2006.01)

(52) U.S. Cl.
CPC .............. *F16G 13/06* (2013.01); *B62M 9/00* (2013.01); *B62M 2009/005* (2013.01)

(58) Field of Classification Search
CPC .... B62M 2009/005; B62M 9/00; F16G 13/06
USPC .................................. 474/206, 230
See application file for complete search history.

(56) References Cited

U.S. PATENT DOCUMENTS

| 6,110,064 | A | 8/2000 | Guichard | |
|---|---|---|---|---|
| 7,325,391 | B1* | 2/2008 | Oishi | F16G 13/06 474/206 |
| 8,734,280 | B2* | 5/2014 | Oishi | F16G 13/06 474/230 |
| 2005/0020394 | A1* | 1/2005 | Valle | B62M 9/00 474/155 |
| 2005/0202914 | A1* | 9/2005 | Reiter | F16G 13/06 474/206 |

FOREIGN PATENT DOCUMENTS

DE       202010008814 U1   12/2010
FR            2632599        12/1989

* cited by examiner

*Primary Examiner* — William E Dondero
*Assistant Examiner* — Robert T Reese
(74) *Attorney, Agent, or Firm* — Mori & Ward, LLP

(57) ABSTRACT

A bicycle chain comprises a first inner link plate. The first inner link plate comprises a first end portion, a second end portion, and a first intermediate portion. The first end portion includes a first opening, a first chamfered section, and a first chamfer-free section. The first chamfer-free section is provided in at least a first chamfer-free angular range when viewed from an axial direction parallel to a first center axis. The first chamfer-free angular range is defined from a first circumferential end of the first chamfered section to a first inner-link longitudinal centerline of the first inner link plate. The first chamfer-free angular range is equal to or greater than 30 degrees with respect to the first center axis.

25 Claims, 19 Drawing Sheets

BICYCLE CHAIN

BACKGROUND OF THE INVENTION

1. Field of the Invention

The present invention relates to a bicycle chain.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is the bicycle chain.

Most bicycles have a drive train that uses a bicycle chain to transmit the pedaling action from the rider to the rear wheel. The bicycle chain has a plurality of inner links and a plurality of outer links that are interconnected in an alternating manner by a plurality of pins. Typically, each of the inner links includes a pair of inner plates. Each of the outer pin links includes a pair of outer plates.

SUMMARY OF THE INVENTION

In accordance with a first aspect of the present invention, a bicycle chain comprises a first inner link plate. The first inner link plate comprises a first end portion, a second end portion, and a first intermediate portion. The first end portion includes a first opening, a first chamfered section, and a first chamfer-free section. The first opening has a first center axis. The first chamfered section extends along an outer periphery of the first end portion. The first chamfer-free section is free from being chamfered. The first chamfer-free section extends along the outer periphery of the first end portion from a first circumferential end of the first chamfered section. The first chamfer-free section is provided in at least a first chamfer-free angular range when viewed from an axial direction parallel to the first center axis. The second end portion includes a second opening having a second center axis. The first chamfer-free angular range is defined from the first circumferential end of the first chamfered section to a first inner-link longitudinal centerline of the first inner link plate. The first inner-link longitudinal centerline is perpendicular to the first center axis and the second center axis when viewed from the axial direction. The first chamfer-free angular range is equal to or greater than 30 degrees with respect to the first center axis. The first intermediate portion interconnects the first end portion and the second end portion.

In accordance with a second aspect of the present invention, the bicycle chain according to the first aspect is configured so that the first chamfer-free angular range is equal to or greater than 45 degrees with respect to the first center axis.

In accordance with a third aspect of the present invention, the bicycle chain according to the second aspect is configured so that the first chamfer-free angular range is equal to or greater than 60 degrees with respect to the first center axis.

In accordance with a fourth aspect of the present invention, the bicycle chain according to the first aspect is configured so that the first chamfered section is provided in at least a first chamfer angular range when viewed from the axial direction. The first chamfer angular range is defined from the first circumferential end of the first chamfered section to a first perpendicular axis perpendicular to the first inner-link longitudinal centerline and the first center axis when viewed from the axial direction. The first chamfer angular range is equal to or greater than 20 degrees with respect to the first center axis.

In accordance with a fifth aspect of the present invention, the bicycle chain according to the fourth aspect is configured so that the first chamfer angular range is equal to or smaller than 30 degrees with respect to the first center axis.

In accordance with a sixth aspect of the present invention, the bicycle chain according to the first aspect is configured so that the second end portion includes a second chamfered section and a second chamfer-free section. The second chamfered section extends along an outer periphery of the second end portion. The second chamfer-free section is free from being chamfered. The second chamfer-free section extending along the outer periphery of the second end portion from a second circumferential end of the second chamfered section. The second chamfer-free section is provided in at least a second chamfer-free angular range when viewed from the axial direction. The second chamfer-free angular range is defined from the second circumferential end of the second chamfered section to the first inner-link longitudinal centerline when viewed from the axial direction. The second chamfer-free angular range is equal to or greater than 30 degrees with respect to the second center axis.

In accordance with a seventh aspect of the present invention, the bicycle chain according to the sixth aspect is configured so that the first chamfer-free angular range is defined on a first side of the first inner link plate with respect to the first inner-link longitudinal centerline. The second chamfer-free angular range is defined on a second side of the first inner link plate with respect to the first inner-link longitudinal centerline. The second side is opposite to the first side with respect to the first inner-link longitudinal centerline.

In accordance with an eighth aspect of the present invention, the bicycle chain according to the seventh aspect is configured so that the second chamfer-free angular range is equal to or greater than 45 degrees with respect to the second center axis.

In accordance with a ninth aspect of the present invention, the bicycle chain according to the eighth aspect is configured so that the second chamfer-free angular range is equal to or greater than 60 degrees with respect to the second center axis.

In accordance with a tenth aspect of the present invention, the bicycle chain according to the sixth aspect is configured so that the second chamfered section is provided in at least a second chamfer angular range when viewed from the axial direction. The second chamfer angular range is defined from the second circumferential end of the second chamfered section to a second perpendicular axis perpendicular to the first inner-link longitudinal centerline and the second center axis when viewed from the axial direction. The second chamfer angular range is equal to or greater than 20 degrees with respect to the second center axis.

In accordance with an eleventh aspect of the present invention, the bicycle chain according to the tenth aspect is configured so that the second chamfer angular range is equal to or smaller than 30 degrees with respect to the second center axis.

In accordance with a twelfth aspect of the present invention, the bicycle chain according to the first aspect is configured so that the first end portion includes a third chamfered section extending along the outer periphery of the first end portion and provided on an opposite side of the first chamfered section with respect to the first inner-link longitudinal centerline. The first chamfer-free section extends along the outer periphery of the first end portion from the first circumferential end of the first chamfered section to a third circumferential end of the third chamfer chamfered section. The first chamfer-free section is provided in at least a third chamfer-free angular range when viewed from the axial direction. The third chamfer-free angular range is defined from the third circumferential end of the third chamfered section to the first inner-link longitudinal centerline when viewed from the axial direction.

In accordance with a thirteenth aspect of the present invention, the bicycle chain according to the twelfth aspect is configured so that the third chamfer-free angular range has an angle smaller than an angle of the first chamfer-free angular range.

In accordance with a fourteenth aspect of the present invention, the bicycle chain according to the twelfth aspect is configured so that the second end portion includes a second chamfered section and a second chamfer-free section. The second chamfered section extends along an outer periphery of the second end portion. The second chamfer-free section is free from being chamfered, the second chamfer-free section extending along the outer periphery of the second end portion from a second circumferential end of the second chamfer chamfered section. The second chamfer-free section is provided in at least a second chamfer-free angular range when viewed from the axial direction. The second chamfer-free angular range is defined from the second circumferential end of the second chamfer to the first inner-link longitudinal centerline when viewed from the axial direction. The second chamfer-free angular range is equal to or greater than 30 degrees with respect to the second center axis.

In accordance with a fifteenth aspect of the present invention, the bicycle chain according to the fourteenth aspect is configured so that the second end portion includes a fourth chamfered section extending along the outer periphery of the second end portion and provided on an opposite side of the second chamfered section with respect to the first inner-link longitudinal centerline. The second chamfer-free section extends along the outer periphery of the second end portion from the second circumferential end of the second chamfered section to a fourth circumferential end of the fourth chamfered section. The second chamfer-free section is provided in at least a fourth chamfer-free angular range when viewed from the axial direction. The fourth chamfer-free angular range is defined from the fourth circumferential end of the fourth chamfered section to the first inner-link longitudinal centerline when viewed from the axial direction.

In accordance with a sixteenth aspect of the present invention, the bicycle chain according to the fifteenth aspect is configured so that the fourth chamfer-free angular range has an angle smaller than an angle of the second chamfer-free angular range.

In accordance with a seventeenth aspect of the present invention, the bicycle chain according to the fifteenth aspect is configured so that the first chamfer-free angular range and the fourth chamfer-free angular range are defined on a first side of the first inner link plate with respect to the first inner-link longitudinal centerline. The second chamfer-free angular range and the third chamfer-free angular range are defined on a second side of the first inner link plate. The second side is opposite to the first side with respect to the first inner-link longitudinal centerline.

In accordance with an eighteenth aspect of the present invention, the bicycle chain according to the first aspect further comprises a second inner link plate spaced apart from the first inner link plate in the axial direction. The first inner link plate includes a first surface configured to face the second inner link plate and a second surface opposite to the first surface. The first chamfered section and the first chamfer-free section are provided on the first surface. The second surface is configured to face a bicycle frame in a state where the bicycle chain engages with a bicycle sprocket.

In accordance with a nineteenth aspect of the present invention, the bicycle chain according to the eighteenth aspect further comprises a first outer link plate, a second outer link plate, and a first link pin. The second outer link plate is spaced apart from the first outer link plate in the axial direction. The first link pin is configured to rotatably couple the first inner link plate to the first outer link plate and configured to rotatably couple the second inner link plate to the second outer link plate. The first inner link plate is provided between the first outer link plate and the second inner link plate in the axial direction. The second inner link plate is provided between the first inner link plate and the second outer link plate in the axial direction. The first outer link plate and the first inner link plate are configured to be positioned closer to a bicycle frame than the second outer link plate and the second inner link plate respectively in a state where the bicycle chain engages with the bicycle sprocket.

In accordance with a twentieth aspect of the present invention, the bicycle chain according to the nineteenth aspect is configured so that the first end portion of the first inner link plate is positioned downstream of the second end portion of the first inner link plate with respect to a chain driving direction in a state where the bicycle chain engages with the bicycle sprocket.

In accordance with a twenty-first aspect of the present invention, the bicycle chain according to the twentieth aspect is configured so that the first inner link plate has a first side and a second side opposite to the first side with respect to the first inner-link longitudinal centerline. The first chamfer-free angular range is defined on the first side. The first side is provided closer to a rotation axis of the bicycle sprocket than the second side in a state where the bicycle chain engages with the bicycle sprocket.

In accordance with a twenty-second aspect of the present invention, a bicycle chain comprises a first inner link plate. The first inner link plate comprises a first end portion, a second end portion, and a first intermediate portion. The first end portion includes a first opening, a first chamfered section, and a first chamfer-free section. The first opening has a first center axis. The first chamfered section extends along an outer periphery of the first end portion. The first chamfer-free section is free from being chamfered. The first chamfer-free section extends along the outer periphery of the first end portion from a first circumferential end of the first chamfered section. The first chamfer-free section is provided in at least a first chamfer-free angular range when viewed from an axial direction parallel to the first center axis. The first chamfer-free angular range is defined from the first circumferential end of the first chamfered section to a first inner-link longitudinal centerline of the first inner link plate. The second end portion includes a second opening, a second chamfered section, and a second chamfer-free section. The second opening has a second center axis. The second chamfered section is free from being chamfered. The second chamfer-free section extends along an outer periphery of the second end portion from a second circumferential end of the second chamfered section. The second chamfer-free section is provided in at least a second chamfer-free angular range when viewed from the axial direction. The second chamfer-free angular range is defined from the second circumferential end of the second chamfered section to the first inner-link longitudinal centerline when viewed from the axial direction. The first inner-link longitudinal centerline is perpendicular to the first center axis and the second center axis when viewed from the axial direction. The first intermediate portion interconnects the first end portion and the second end portion. The first end portion further includes a third chamfered section extending along the outer periphery of the first end portion and provided on an opposite side of the first chamfered section with respect to the first inner-link longitudinal centerline. The first chamfer-free section extends along the outer periphery of the first end portion from the first circumferential end of the first chamfered section to a third circumferential end of the third chamfered section. The first chamfer-free section is provided in at least a third chamfer-free angular range when viewed from the axial direction. The third chamfer-free angular range is defined from the third circumferential end of the third chamfered section to the first inner-link longitudinal centerline when viewed from the axial direction. The third chamfer-free angular range has an angle different from an angle of the first chamfer-free angular range.

In accordance with a twenty-third aspect of the present invention, the bicycle chain according to the twenty-second aspect is configured so that the third chamfer-free angular range has an angle smaller than an angle of the first chamfer-free angular range.

In accordance with a twenty-fourth aspect of the present invention, the bicycle chain according to the twenty-second aspect is configured so that the second end portion further includes a fourth chamfered section extending along the outer periphery of the second end portion and provided on an opposite side of the second chamfered section with respect to the first inner-link longitudinal centerline. The second chamfer-free section extends along the outer periphery of the second end portion from the second circumferential end of the second chamfered section to a fourth circumferential end of the fourth chamfered section. The second chamfer-free section is provided in at least a fourth chamfer-free angular range when viewed from the axial direction. The fourth chamfer-free angular range is defined from the fourth circumferential end of the fourth chamfered section to the first inner-link longitudinal centerline when viewed from the axial direction. The fourth chamfer-free angular range has an angle different from an angle of the second chamfer-free angular range.

In accordance with a twenty-fifth aspect of the present invention, the bicycle chain according to the twenty-fourth aspect is configured so that the fourth chamfer-free angular range has an angle smaller than an angle of the second chamfer-free angular range.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
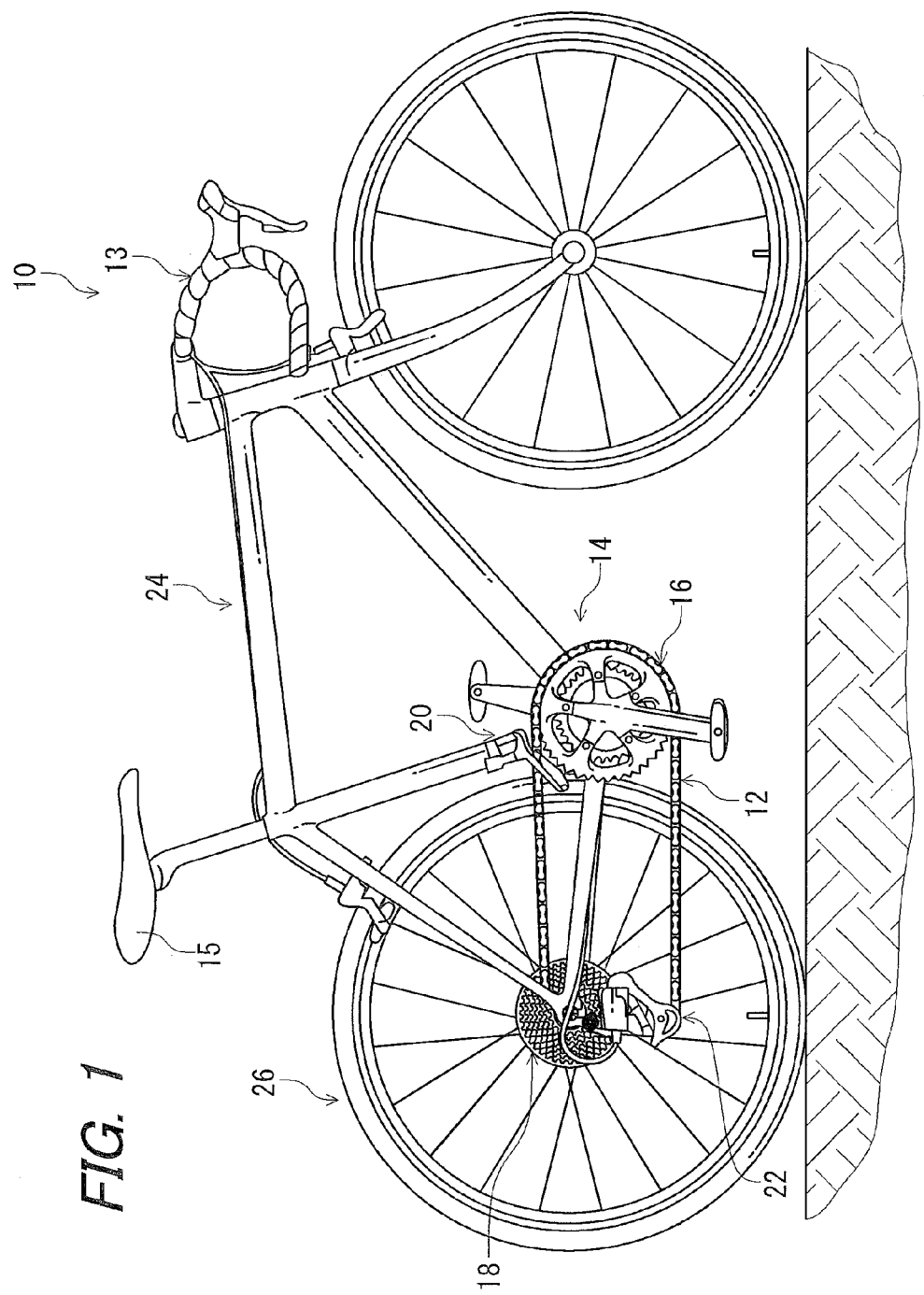
FIG. 1 is a side elevational view of a bicycle having a drive train that uses a bicycle chain in accordance with one embodiment of the present invention.

The embodiments will now be described with reference to the accompanying drawings, wherein like reference numerals designate corresponding or identical elements throughout the various drawings.

Referring initially to FIG. 1, a bicycle 10 is illustrated that uses a bicycle chain 12 in accordance with one embodiment of the present invention. The bicycle 10 includes, among other things, a handlebar 13, a drive train 14, and a saddle 15. The drive train 14 is configured to convert the rider's pedaling force into driving force. The bicycle chain 12 is a part of the drive train 14. The drive train 14 also includes a front crankset 16, a bicycle sprocket 18, a front derailleur 20, and a rear derailleur 22. The front crankset 16 is rotatably mounted on a bottom bracket of a bicycle frame 24. The bicycle sprocket 18 is a rear sprocket mounted to a rear axle of a rear wheel 26. The bicycle chain 12 is arranged on the front crankset 16 and the bicycle sprocket 18 so as to extend therebetween. The front derailleur 20 and the rear derailleur 22 are configured and arranged to change gears by shifting the bicycle chain 12 in a transverse direction of the bicycle 10.

In this embodiment, the following directional terms "front", "rear", "forward", "rearward", "left", "right", "transverse", "upward" and "downward" as well as any other similar directional terms refer to those directions which are determined on the basis of the rider who sits on the saddle 15 of the bicycle 10 with facing the handlebar 13, for example. Accordingly, these terms, as utilized to describe the bicycle 10 including the bicycle chain 12 should be interpreted relative to the bicycle 10 as used in an upright riding position on a horizontal surface as illustrated in FIG. 1. These terms, as utilized to describe the bicycle chain 12 should be interpreted relative to the bicycle chain 12 as mounted on the bicycle 10 used in an upright riding position on a horizontal surface as illustrated in FIG. 1.

Figure 2:
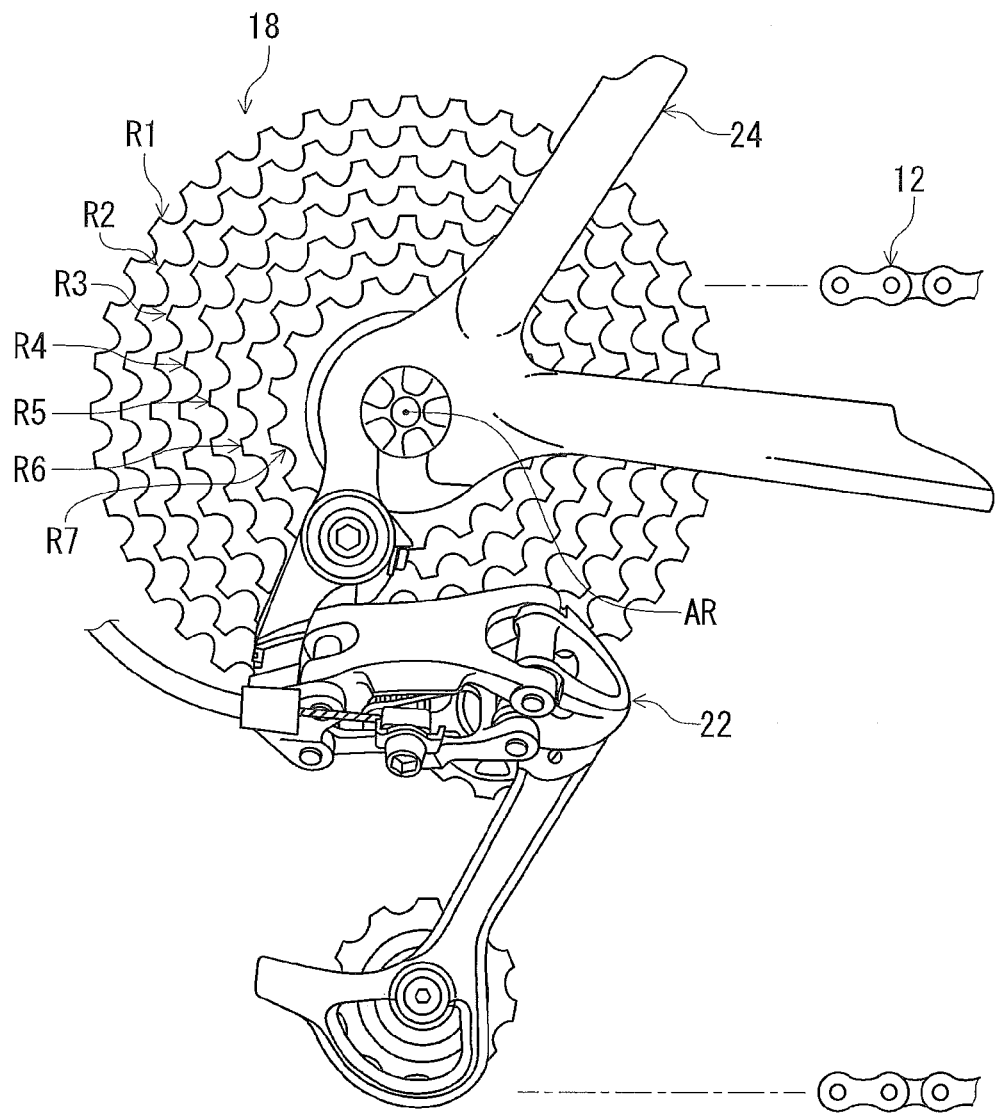
FIG. 2 is an enlarged partial side elevational view of the drive train illustrated in FIG. 1.

Referring now to FIG. 2, the bicycle sprocket 18 includes first to seventh rear sprockets R1 to R7 having different numbers of teeth from each other. The first to seventh rear sprockets R1 to R7 are rotatable relative to the bicycle frame 24 about a rotation axis AR. The first to seventh rear sprockets R1 to R7 are lined up along the rotation axis AR. The first to seventh rear sprockets R1 to R7 are arranged along the rotation axis AR from the bicycle frame 24 to the rear derailleur 22 in this order. The first rear sprocket R1 includes the largest number of teeth in the first to seventh rear sprockets R1 to R7. The seventh rear sprocket R7 includes the smallest number of teeth in the first to seventh rear sprockets R1 to R7.

As illustrated in FIG. 2, the rear derailleur 22 is mounted on the bicycle frame 24 and is configured to guide the bicycle chain 12 from one rear sprocket to another adjacent rear sprocket among the first to seventh rear sprockets R1 to R7. Since the rear derailleur 22 includes well known structures, they will not be described in detail herein.

Figure 3:
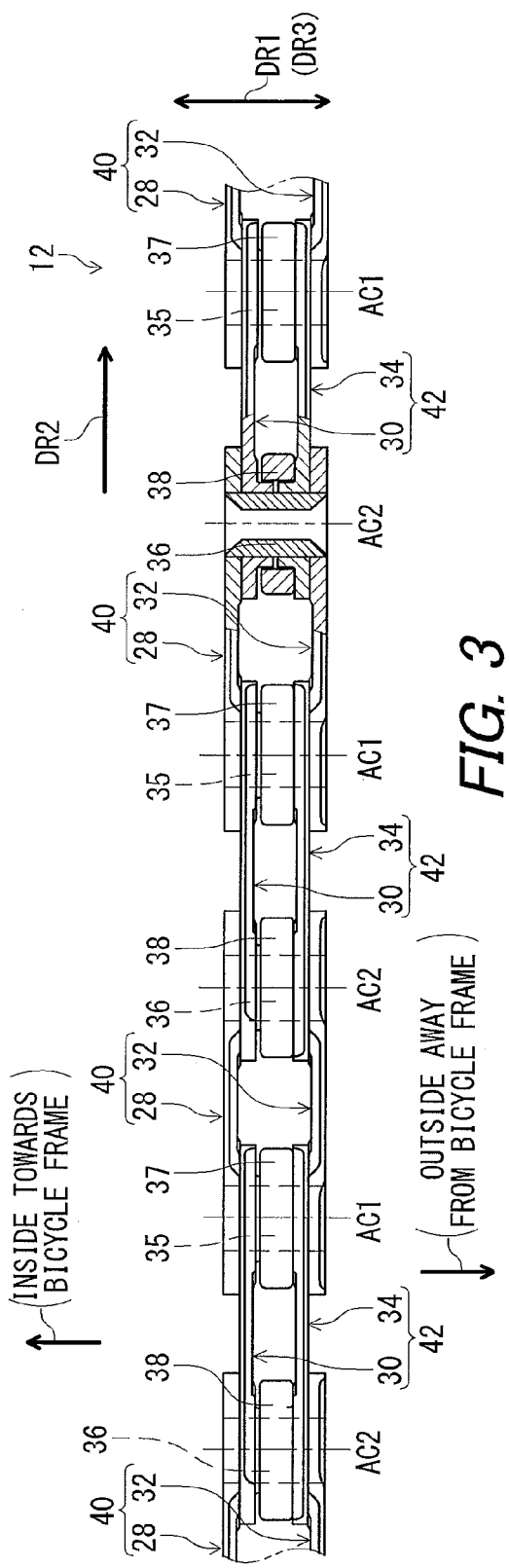
FIG. 3 is a partial plan view of the bicycle chain illustrated in FIG. 1.

Referring to FIG. 3, the bicycle chain 12 includes first outer link plates 28, first inner link plates 30, second outer link plates 32, second inner link plates 34, first link pins 35, second link pins 36, first rollers 37, and second rollers 38. Each opposed pair of the first outer link plate 28 and the second outer link plate 32 forms an outer link 40. Each opposed pair of the first inner link plate 30 and the second inner link plate 34 forms an inner link 42. The inner links 42 are interconnected in an alternating manner with the outer links 40 by the first link pins 35 and the second link pins 36. A master chain link (not shown) preferably interconnects two pairs of the inner links 42 together so as to form a single continuous loop as depicted in FIG. 1.

As illustrated in FIG. 3, the second outer link plates 32 are spaced apart from the first outer link plates 28 in a transverse direction DR1 of the bicycle 10, respectively. The first inner link plates 30 and the second inner link plates 34 are provided between the first outer link plates 28 and the second outer link plates 32 in the transverse direction DR1. More specifically, the first inner link plate 30 is provided between the first outer link plate 28 and the second outer link plate 32 in the transverse direction DR1. The second inner link plate 34 is provided between the first outer link plate 28 and the second outer link plate 32 in the transverse direction DR1. The first inner link plate 30 is provided between the first outer link plate 28 and the second inner link plate 34 in the transverse direction DR1, i.e. in the axial direction. The second inner link plate 34 is provided between the first inner link plate 30 and the second outer link plate 32 in the transverse direction DR1, i.e. in the axial direction. The first outer link plate 28 and the first inner link plate 30 are configured to be positioned closer to the bicycle frame 24 than the second outer link plate 32 and the second inner link plate 34 respectively in a state where the bicycle chain 12 engages with the bicycle sprocket 18 (FIGS. 1 and 2).

Referring to FIG. 3, the outer links 40 and the inner links 42 are alternatively arranged in a chain driving direction DR2. The chain driving direction DR2 is defined with respect to the bicycle chain 12 as a direction in which the bicycle chain 12 is driven by the rider's pedaling force to forwardly move the bicycle 10. The bicycle chain 12 can include a mark indicating the chain driving direction DR2. The outer links 40 are rotatably coupled to the inner links 42, respectively. More specifically, the first outer link plate 28 and the second outer link plate 32 are rotatably coupled to the first inner link plate 30 and the second inner link plate 34 about first rotation axes AC1 by the first link pins 35, respectively. The first outer link plate 28 and the second outer link plate 32 are rotatably coupled to the first inner link plate 30 and the second inner link plate 34 about second rotation axes AC2 by the second link pins 36, respectively.

As illustrated in FIG. 3, the first link pins 35 and the second link pins 36 are alternatively arranged in the chain driving direction DR2. The first rotation axes AC1 and the second rotation axes AC2 are alternatively arranged in the chain driving direction DR2. The first rotation axes AC1 and the second rotation axes AC2 are substantially parallel to the transverse direction DR1 in a state where the bicycle chain 12 is mounted on the front crankset 16 and the bicycle sprocket 18 (FIGS. 1 and 2).

As illustrated in FIG. 3, the first rollers 37 are provided between the first inner link plates 30 and the second inner link plates 34, respectively. The second rollers 38 are provided between the first inner link plates 30 and the second inner link plates 34, respectively. The first rollers 37 and the second rollers 38 are alternatively arranged in the chain driving direction DR2.

As illustrated in FIG. 3, the second inner link plate 34 is spaced apart from the first inner link plate 30 in an axial direction DR3. The axial direction DR3 of the bicycle chain 12 can be defined to be parallel to the transverse direction DR1 when the bicycle chain 12 engages with the bicycle sprocket 18. Furthermore, the axial direction DR3 of the bicycle chain 12 can be defined to be parallel to the first rotation axes AC1 and the second rotation axes AC2. The second outer link plate 32 is spaced apart from the first outer link plate 28 in the axial direction DR3. The first inner link plate 30 is provided between the first outer link plate 28 and the second inner link plate 34 in the axial direction DR3. The second inner link plate 34 is provided between the first inner link plate 30 and the second outer link plate 32 in the axial direction DR3. The first link pin 35 is configured to rotatably couple the first inner link plate 30 to the first outer link plate 28 and configured to rotatably couple the second inner link plate 34 to the second outer link plate 32.

Figure 4:
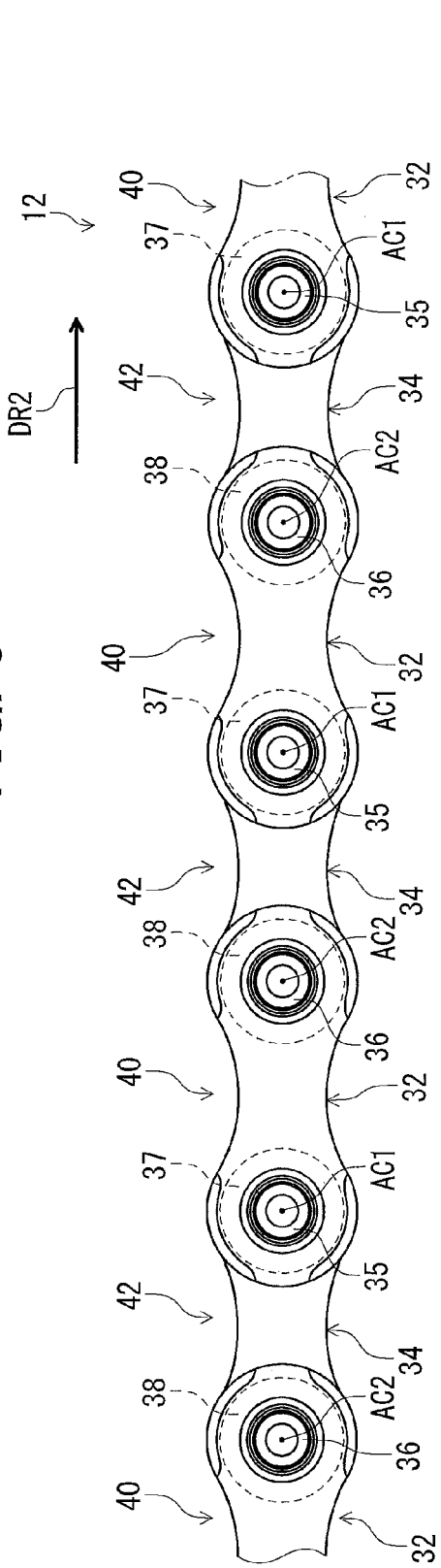
FIG. 4 is a partial side elevational view of the bicycle chain illustrated in FIG. 1.

Referring to FIG. 4, each of the first link pins 35 has a cylindrical shape and includes a through-hole extending along the first rotation axis AC1. Each of the second link pins 36 has a cylindrical shape and includes a through-hole extending along the second rotation axis AC2. The first rotation axes AC1 are defined as center axes of the first link pins 35, respectively. The second rotation axes AC2 are defined as center axes of the second link pins 36, respectively. While the first link pins 35 have substantially the same shape as a shape of the second link pins 36, it will be apparent to those skilled in the bicycle field that the first link pins 35 can have a different shape from the shape of the second link pins 36. It will be apparent to those skilled in the bicycle field that the first link pins 35 and the second link pins 36 can have a recess at each end instead of the through-hole.

As illustrated in FIG. 4, each of the first rollers 37 are rotatable relative to the opposed pair of the first inner link plate 30 and the second inner link plate 34 about the first rotation axis AC1. Each of the second rollers 38 are rotatable relative to the opposed pair of the first inner link plate 30 and the second inner link plate 34 about the second rotation axis AC2. While the first rollers 37 have substantially the same shape as a shape of the second rollers 38, it will be apparent to those skilled in the bicycle field that the first rollers 37 can have a different shape from the shape of the second rollers 38.

Figure 5:
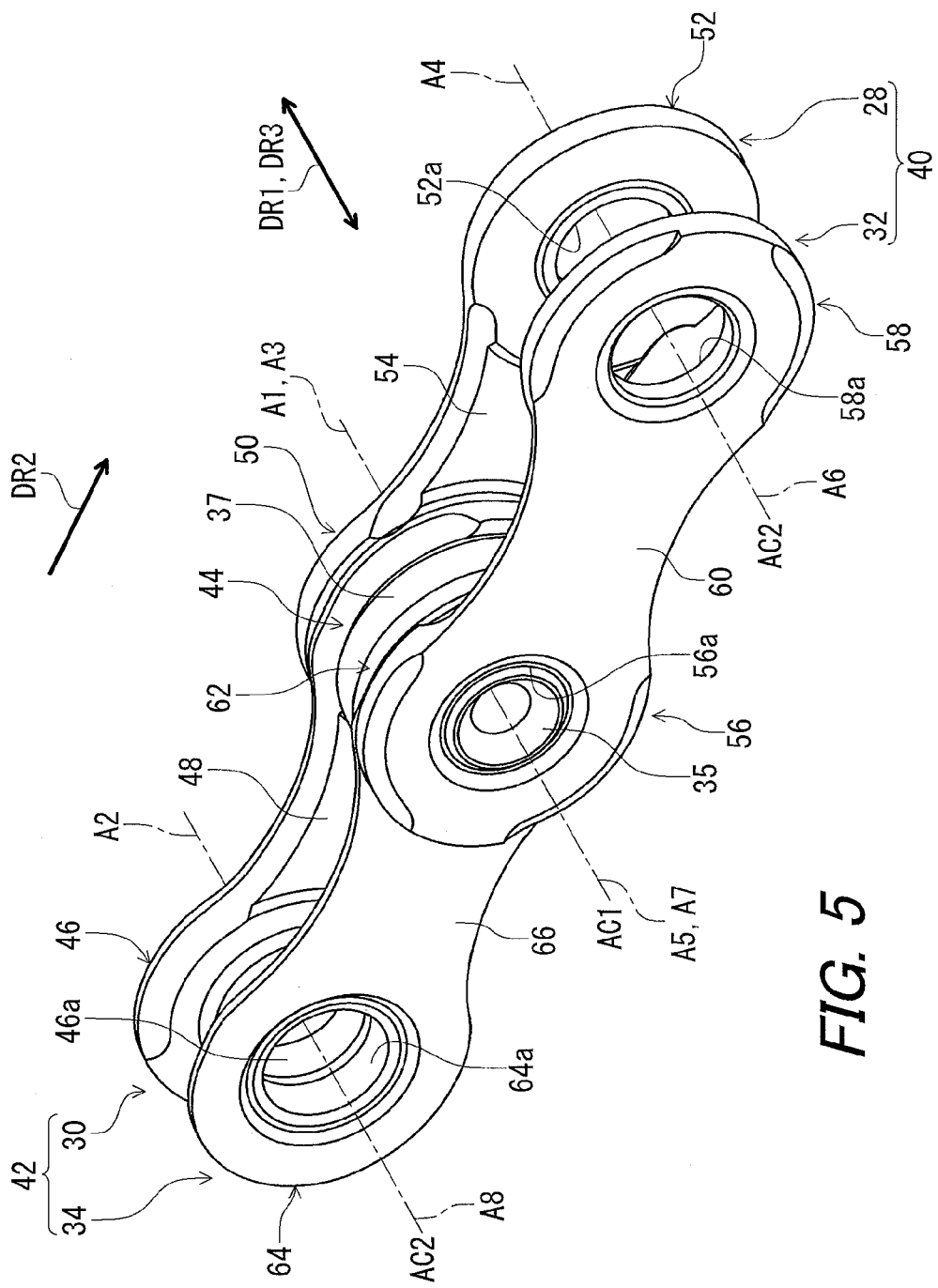
FIG. 5 is an enlarged perspective view of a portion of the bicycle chain illustrated in FIG. 4.
Figure 6:
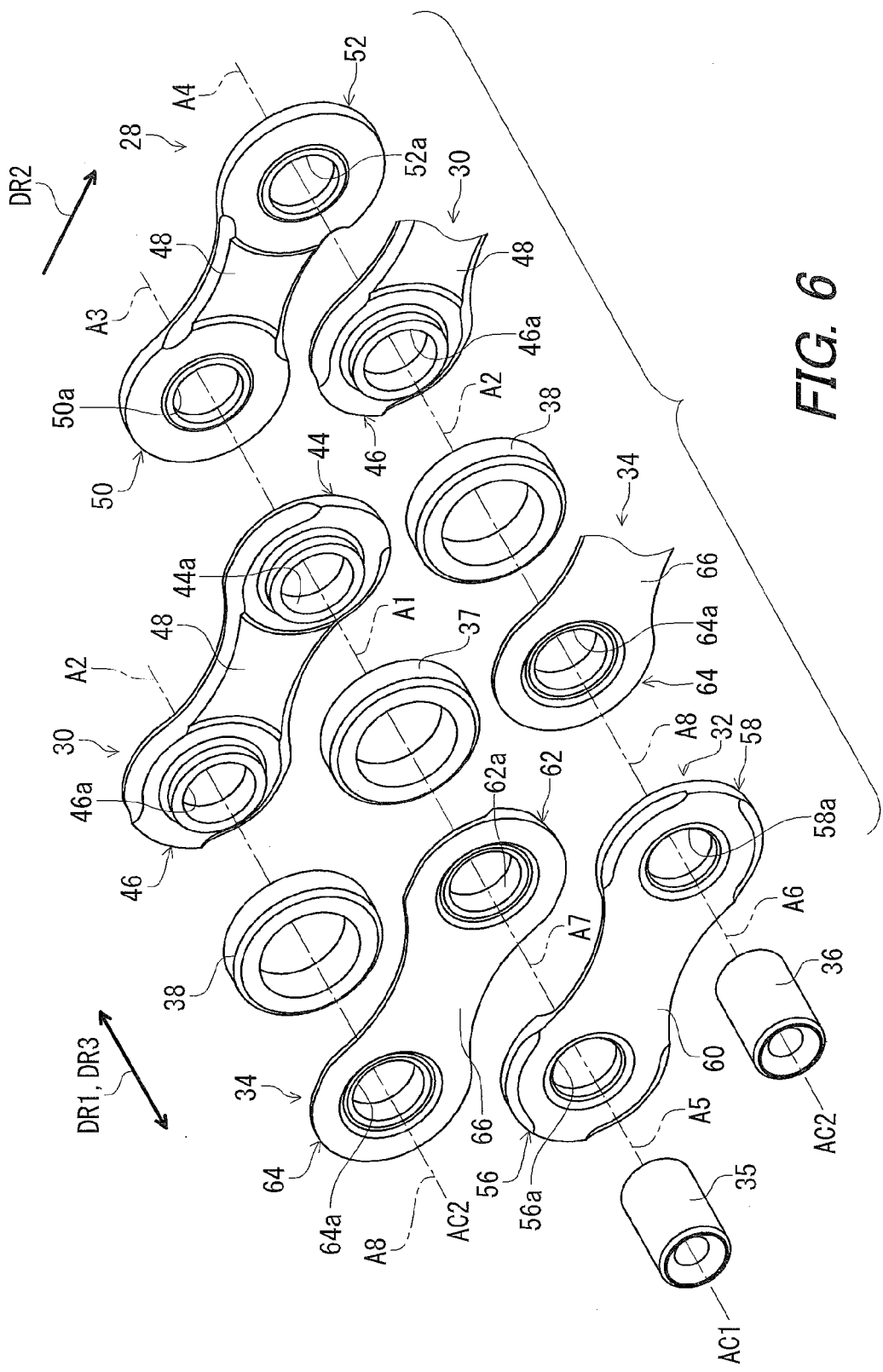
FIG. 6 is an exploded perspective view of a portion of the bicycle chain illustrated in FIG. 5.

Referring to FIGS. 5 and 6, each of the first inner link plate 30 comprises a first end portion 44, a second end portion 46, and a first intermediate portion 48. The first end portion 44 includes a first opening 44a through which one of the first link pins 35 extends (FIG. 6). The second end portion 46 includes a second opening 46a through which one of the second link pins 36 extends. The first intermediate portion 48 is provided between the first end portion 44 and the second end portion 46. The first intermediate portion 48 interconnects the first end portion 44 and the second end portion 46. The first end portion 44 of the first inner link plate 30 is positioned downstream of the second end portion 46 of the first inner link plate 30 with respect to the chain driving direction DR2 in a state where the bicycle chain 12 engages with the bicycle sprocket 18 (FIGS. 1 and 2). The first end portion 44, the second end portion 46, and the first intermediate portion 48 are integrally provided with each other as a one-piece unitary member. The first inner link plate 30 is made of a hard and/or rigid material such as a metallic material.

As illustrated in FIG. 6, the first opening 44a has a first center axis A1, and the second opening 46a has a second center axis A2. The first center axis A1 is substantially parallel to the first rotation axis AC1 and substantially coincides with the first rotation axis AC1. The second center axis A2 is substantially parallel to the second rotation axis AC2 and substantially coincides with the second rotation axis AC2. The first center axis A1 can be defined by the first rotation axis AC1. The second center axis A2 can be defined by the second rotation axis AC2. Furthermore, the axial direction DR3 of the bicycle chain 12 can be defined to be parallel to the first center axis A1 of the first opening 44a. While the first opening 44a and the second opening 46a are illustrated as two separate and distinct openings, it will be apparent to those skilled in the bicycle field that a single elongated slot can extend between the first opening 44a and the second opening 46a. Thus, the term "opening" should not be limited to a continuous circular hole that extends 360 degrees.

Referring to FIGS. 5 and 6, each of the first outer link plates 28 comprises a third end portion 50, a fourth end portion 52, and a second intermediate portion 54. The third end portion 50 includes a third opening 50a through which one of the first link pins 35 extends. The fourth end portion 52 includes a fourth opening 52a through which one of the second link pins 36 extends. The second intermediate portion 54 is provided between the third end portion 50 and the fourth end portion 52. The second intermediate portion 54 interconnects the third end portion 50 and the fourth end portion 52. The fourth end portion 52 is positioned downstream of the third end portion 50 with respect to the chain driving direction DR2 in a state where the bicycle chain 12 engages with the bicycle sprocket 18 (FIGS. 1 and 2). The third end portion 50, the fourth end portion 52, and the second intermediate portion 54 are integrally provided with each other as a one-piece unitary member. The first outer link plate 28 is made of a hard and/or rigid material such as a metallic material.

As illustrated in FIG. 6, the third opening 50a has a third center axis A3, and the fourth opening 52a has a fourth center axis A4. The third center axis A3 is substantially parallel to the first rotation axis AC1 and substantially coincides with the first rotation axis AC1. The fourth center axis A4 is substantially parallel to the second rotation axis AC2 and substantially coincides with the second rotation axis AC2. The third center axis A3 can be defined by the first rotation axis AC1. The fourth center axis A4 can be defined by the second rotation axis AC2. While the third opening 50a and the fourth opening 52a are illustrated as two separate and distinct openings, it will be apparent to those skilled in the bicycle field that a single elongated slot can extend between the third opening 50a and the fourth opening 52a. Thus, the term "opening" should not be limited to a continuous circular hole that extends 360 degrees.

Referring to FIGS. 5 and 6, each of the second outer link plates 32 comprises a fifth end portion 56, a sixth end portion 58, and a third intermediate portion 60. The fifth end portion 56 includes a fifth opening 56a through which one of the first link pins 35 extends. The sixth end portion 58 includes a sixth opening 58a through which one of the second link pins 36 extends. The third intermediate portion 60 is provided between the fifth end portion 56 and the sixth end portion 58. The third intermediate portion 60 interconnects the fifth end portion 56 and the sixth end portion 58. The sixth end portion 58 is positioned downstream of the fifth end portion 56 with respect to the chain driving direction DR2 in a state where the bicycle chain 12 engages with the bicycle sprocket 18 (FIGS. 1 and 2). The fifth end portion 56, the sixth end portion 58, and the third intermediate portion 60 are integrally provided with each other as a one-piece unitary member. The second outer link plate 32 is made of a hard and/or rigid material such as a metallic material.

As illustrated in FIG. 6, the fifth opening 56a has a fifth center axis A5, and the sixth opening 58a has a sixth center axis A6. The fifth center axis A5 is substantially parallel to the first rotation axis AC1 and substantially coincides with the first rotation axis AC1. The sixth center axis A6 is substantially parallel to the second rotation axis AC2 and substantially coincides with the second rotation axis AC2. The fifth center axis A5 can be defined by the first rotation axis AC1. The sixth center axis A6 can be defined by the second rotation axis AC2. While the fifth opening 56a and the sixth opening 58a are illustrated as two separate and distinct openings, it will be apparent to those skilled in the bicycle field that a single elongated slot can extend between the fifth opening 56a and the sixth opening 58a. Thus, the term "opening" should not be limited to a continuous circular hole that extends 360 degrees.

Referring to FIGS. 5 and 6, each of the second inner link plate 34 comprises a seventh end portion 62, an eighth end portion 64, and a fourth intermediate portion 66. The seventh end portion 62 includes a seventh opening 62a through which one of the first link pins 35 extends. The eighth end portion 64 includes an eighth opening 64a through which one of the second link pins 36 extends. The fourth intermediate portion 66 is provided between the seventh end portion 62 and the eighth end portion 64. The fourth intermediate portion 66 interconnects the seventh end portion 62 and the eighth end portion 64. The seventh end portion 62 is positioned downstream of the eighth end portion 64 with respect to the chain driving direction DR2 in a state where the bicycle chain 12 engages with the bicycle sprocket 18. The seventh end portion 62, the eighth end portion 64, and the fourth intermediate portion 66 are integrally provided with each other as a one-piece unitary member. The second inner link plate 34 is made of a hard and/or rigid material such as a metallic material.

As illustrated in FIG. 6, the seventh opening 62a has a seventh center axis A7, and the eighth opening 64a has an eighth center axis A8. The seventh center axis A7 is substantially parallel to the first rotation axis AC1 and substantially coincides with the first rotation axis AC1. The eighth center axis A8 is substantially parallel to the second rotation axis AC2 and substantially coincides with the second rotation axis AC2. The seventh center axis A7 can be defined by the first rotation axis AC1. The eighth center axis A8 can be defined by the second rotation axis AC2. While the seventh opening 62a and the eighth opening 64a are illustrated as two separate and distinct openings, it will be apparent to those skilled in the bicycle field that a single elongated slot can extend between the seventh opening 62a and the eighth opening 64a. Thus, the term "opening" should not be limited to a continuous circular hole that extends 360 degrees.

As illustrated in FIG. 6, each of the first link pins 35 is configured to extend through the third opening 50a and the first opening 44a to rotatably couple the third end portion 50 and the first end portion 44 about the first rotation axis AC1. Each of the first link pins 35 is configured extend through the fifth opening 56a and the seventh opening 62a to rotatably couple the fifth end portion 56 and the seventh end portion 62 about the first rotation axis AC1. In the illustrated embodiment, an inner diameter of the third opening 50a is smaller than an outer diameter of the first link pin 35, and thereby the first link pins 35 are press-fitted in the first openings 44a, respectively. An inner diameter of the first opening 44a is greater than the outer diameter of the first link pin 35. The first link pin 35 extends through the first opening 44a to allow the first inner link plate 30 to rotate relative to the first link pin 35 and the first outer link plate 28. In the illustrated embodiment, an inner diameter of the fifth opening 56a is smaller than the outer diameter of the first link pin 35, and thereby the first link pins 35 are press-fitted in the fifth openings 56a, respectively. An inner diameter of the seventh opening 62a is greater than the outer diameter of the first link pin 35. The first link pin 35 extends through the seventh opening 62a to allow the second inner link plate 34 to rotate relative to the first link pin 35 and the second outer link plate 32.

As illustrated in FIG. 6, each of the second link pins 36 is configured to extend through the fourth opening 52a and the second opening 46a to rotatably couple the fourth end portion 52 and the second end portion 46 about the second rotation axis AC2. Each of the second link pins 36 is configured extend through the sixth opening 58a and the eighth opening 64a to rotatably couple the sixth end portion 58 and the eighth end portion 64 about the second rotation axis AC2. In the illustrated embodiment, an inner diameter of the fourth opening 52a is smaller than an outer diameter of the second link pin 36, and thereby the second link pins 36 are press-fitted in the second openings 46a, respectively. An inner diameter of the second opening 46a is greater than the outer diameter of the second link pin 36. The second link pin 36 extends through the second opening 46a to allow the first inner link plate 30 to rotate relative to the second link pin 36 and the first outer link plate 28. In the illustrated embodiment, an inner diameter of the sixth opening 58a is smaller than the outer diameter of the second link pin 36, and thereby the second link pins 36 are press-fitted in the sixth openings 58a, respectively. An inner diameter of the eighth opening 64a is greater than the outer diameter of the second link pin 36. The second link pin 36 extends through the eighth opening 64a to allow the second inner link plate 34 to rotate relative to the second link pin 36 and the second outer link plate 32. Since the first link pins 35 and the second link pins 36 include well know structures, they will not be described in detail herein.

As illustrated in FIG. 6, each of the first rollers 37 is provided between the first inner link plate 30 and the second inner link plate 34 and rotatably supported by the first inner link plate 30 and the second inner link plate 34. Each of the first rollers 37 has an annular shape and is configured to engage with the teeth of the bicycle sprocket 18. Each of the second rollers 38 is provided between the first inner link plate 30 and the second inner link plate 34 and rotatably supported by the first inner link plate 30 and the second inner link plate 34. Each of the second rollers 38 has an annular shape and is configured to engage with the teeth of the bicycle sprocket 18. Since the first rollers 37 and the second rollers 38 include well know structures, they will not be described in detail herein.

Figure 7:
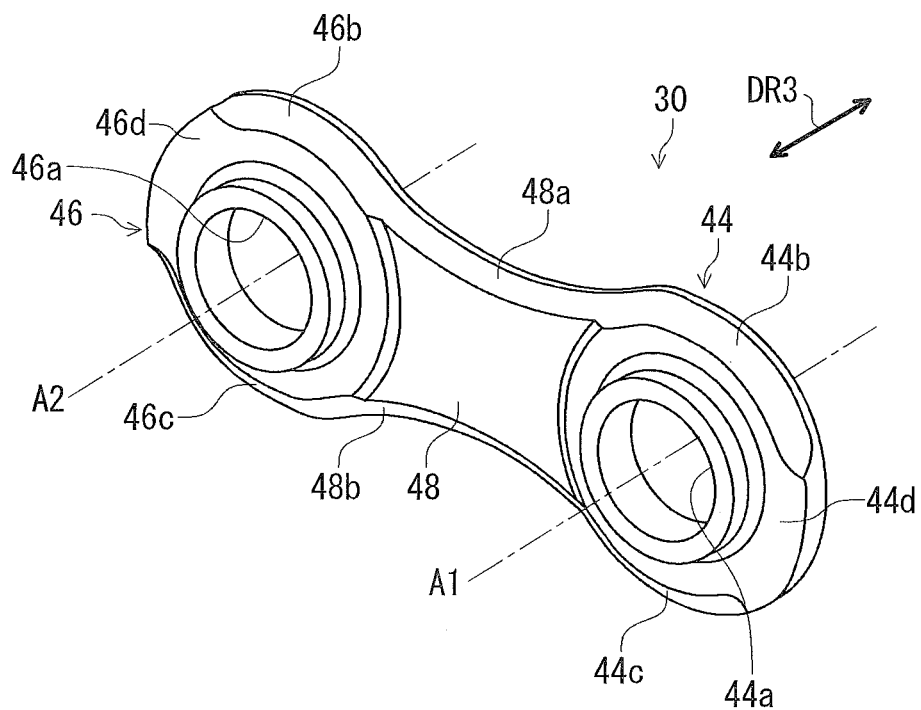
FIG. 7 is an outside perspective view of a first inner link plate illustrated in FIG. 6.
Figure 8:
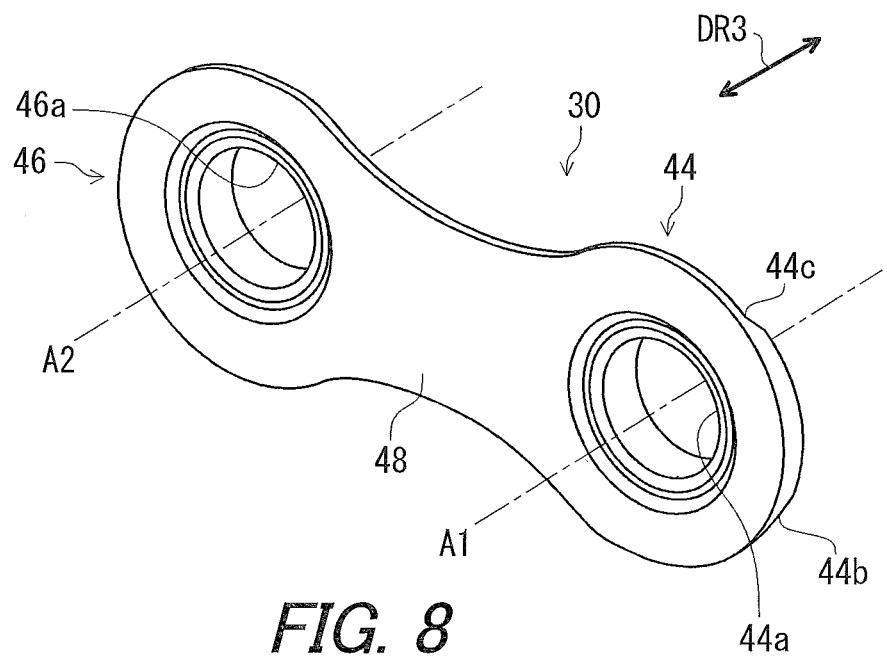
FIG. 8 is an inside perspective view of the first inner link plate illustrated in FIG. 7.

Referring to FIGS. 7 and 8, the first end portion 44 of the first inner link plate 30 includes a first chamfered section 44c, a third chamfered section 44b, and a first chamfer-free section 44d. The first chamfered section 44c extends along an outer periphery of the first end portion 44. The third chamfered section 44b extends along the outer periphery of the first end portion 44 and is provided on an opposite side of the first chamfered section 44c with respect to the first center axis A1. In the illustrated embodiment, the first chamfered section 44c and the third chamfered section 44b have a substantially arc shape extending about the first opening 44a. The first chamfered section 44c and the third chamfered section 44b are provided so that the teeth of the bicycle sprocket 18 smoothly engage with the bicycle chain 12. The first chamfer-free section 44d is free from being chamfered. The first chamfer-free section 44d extends along the outer periphery of the first end portion 44 between the first chamfered section 44c and the third chamfered section 44b.

The second end portion 46 includes a second chamfered section 46b, a fourth chamfered section 46c, and a second chamfer-free section 46d. The second chamfered section 46b extends along an outer periphery of the second end portion 46. The fourth chamfered section 46c extends along the outer periphery of the second end portion 46 and is provided on an opposite side of the second chamfered section 46b with respect to the second center axis A2. In the illustrated embodiment, the second chamfered section 46b and the fourth chamfered section 46c have a substantially arc shape extending about the second opening 46a. The second chamfered section 46b and the fourth chamfered section 46c are provided so that the teeth of the bicycle sprocket 18 smoothly engage with the bicycle chain 12. The second chamfer-free section 46d is free from being chamfered. The second chamfer-free section 46d extends along the outer periphery of the second end portion 46 between the second chamfered section 46b and the fourth chamfered section 46c.

The first intermediate portion 48 includes first intermediate chamfered sections 48a and 48b. The first intermediate chamfered sections 48a and 48b have a substantially arc shape and extend along the first intermediate portion 48 from the first end portion 44 to the second end portion 46. The first intermediate chamfered section 48a is provided between the second chamfered section 46b and the third chamfered section 44b. The first intermediate chamfered section 48b is provided between the first chamfered section 44c and the fourth chamfered section 46c. The first intermediate chamfered sections 48a and 48b are provided so that the teeth of the bicycle sprocket 18 smoothly engage with the bicycle chain 12.

Figure 9:
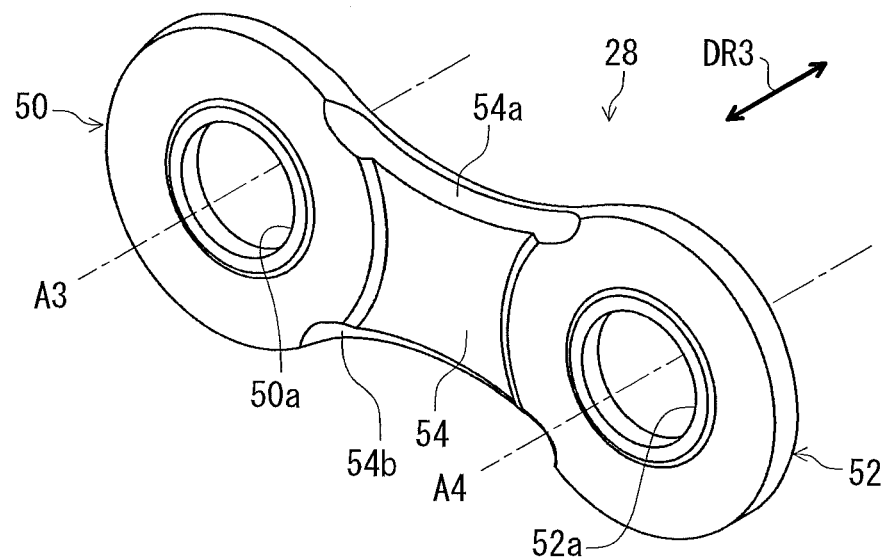
FIG. 9 is an outside perspective view of a first outer link plate illustrated in FIG. 6.
Figure 10:
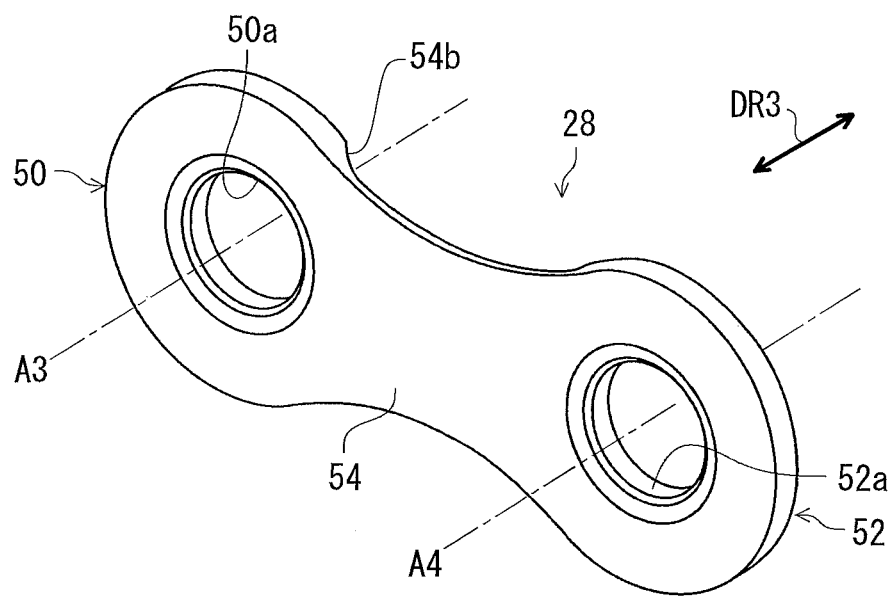
FIG. 10 is an inside perspective view of the first outer link plate illustrated in FIG. 9.

Referring to FIGS. 9 to 10, the second intermediate portion 54 of the first outer link plate 28 includes second intermediate chamfered sections 54a and 54b. The second intermediate chamfered sections 54a and 54b have a substantially arc shape and extend along the second intermediate portion 54 from the third end portion 50 to the fourth end portion 52. The first outer link plate 28 does not include a chamfered section on an opposite side of the second intermediate chamfered sections 54a and 54b. However, it will be apparent to those skilled in the bicycle field from the present disclosure that the first outer link plate 28 can includes a chamfered section on the opposite side of the second intermediate chamfered sections 54a and 54b as well as the second outer link plate 32.

Figure 11:
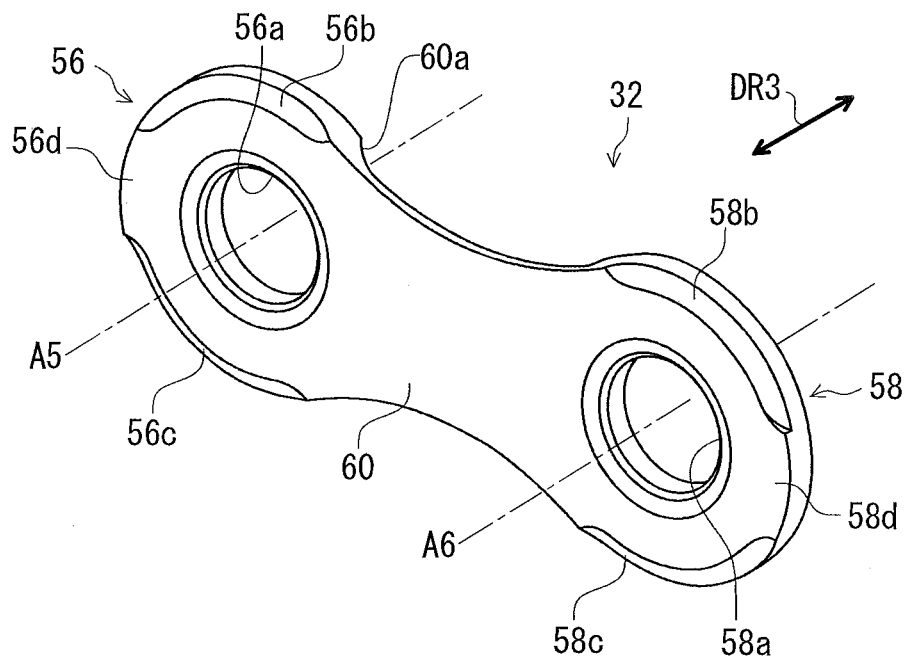
FIG. 11 is an outside perspective view of a second outer link plate illustrated in FIG. 6.
Figure 12:
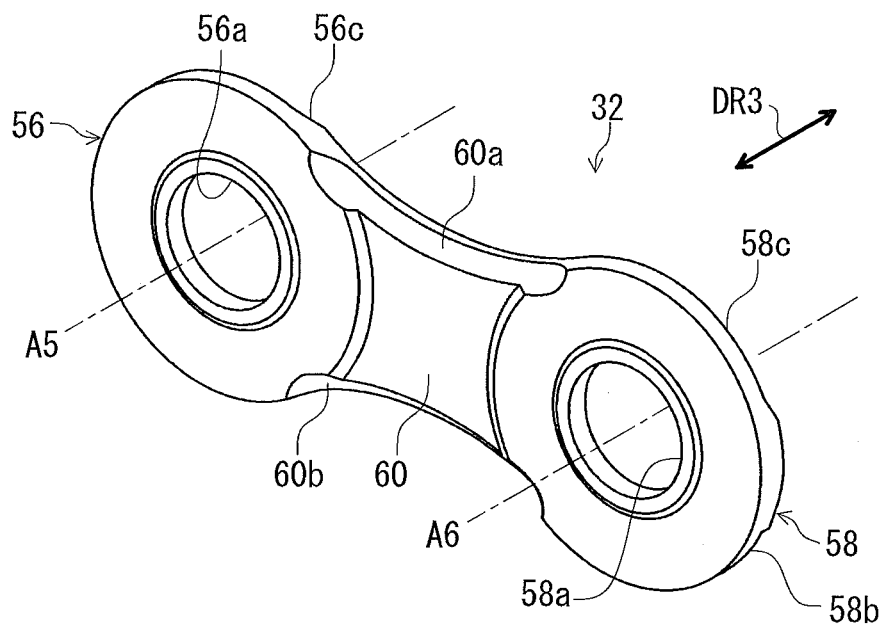
FIG. 12 is an inside perspective view of the second outer link plate illustrated in FIG. 11.

Referring to FIGS. 11 and 12, the fifth end portion 56 of the second outer link plate 32 includes a fifth chamfered section 56c, a seventh chamfered section 56b, and a third chamfer-free section 56d. The fifth chamfered section 56c extends along an outer periphery of the fifth end portion 56. The seventh chamfered section 56b extends along the outer periphery of the fifth end portion 56 and is provided on an opposite side of the fifth chamfered section 56c with respect to the fifth center axis A5. In the illustrated embodiment, the fifth chamfered section 56c and the seventh chamfered section 56b have a substantially arc shape extending about the fifth opening 56a. The third chamfer-free section 56d is free from being chamfered. The third chamfer-free section 56d extends along the outer periphery of the fifth end portion 56 between the fifth chamfered section 56c and the seventh chamfered section 56b.

The sixth end portion 58 includes a sixth chamfered section 58b, an eighth chamfered section 58c, and a fourth chamfer-free section 58d. The sixth chamfered section 58b extends along an outer periphery of the sixth end portion 58. The eighth chamfered section 58c extends along the outer periphery of the sixth end portion 58 and is provided on an opposite side of the sixth chamfered section 58b with respect to the sixth center axis A6. In the illustrated embodiment, the sixth chamfered section 58b and the eighth chamfered section 58c have a substantially arc shape extending about the sixth opening 58a. The fourth chamfer-free section 58d is free from being chamfered. The fourth chamfer-free section 58d extends along the outer periphery of the sixth end portion 58 between the sixth chamfered section 58b and the eighth chamfered section 58c.

Referring to FIGS. 11 and 12, the third intermediate portion 60 includes third intermediate chamfered sections 60a and 60b. The third intermediate chamfered sections 60a and 60b have a substantially arc shape and extend along the third intermediate portion 60 from the fifth end portion 56 to the sixth end portion 58.

Figure 13:
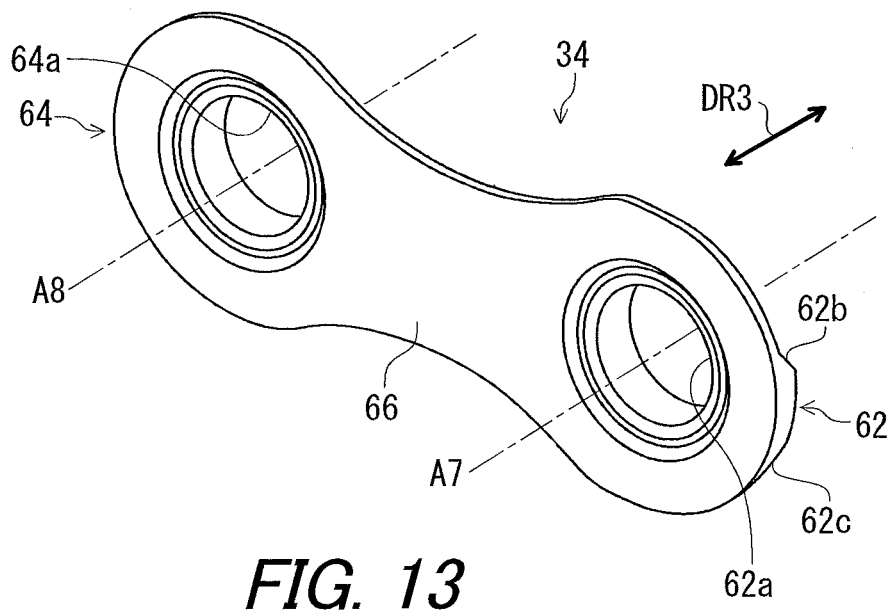
FIG. 13 is an outside perspective view of a second inner link plate illustrated in FIG. 6.
Figure 14:
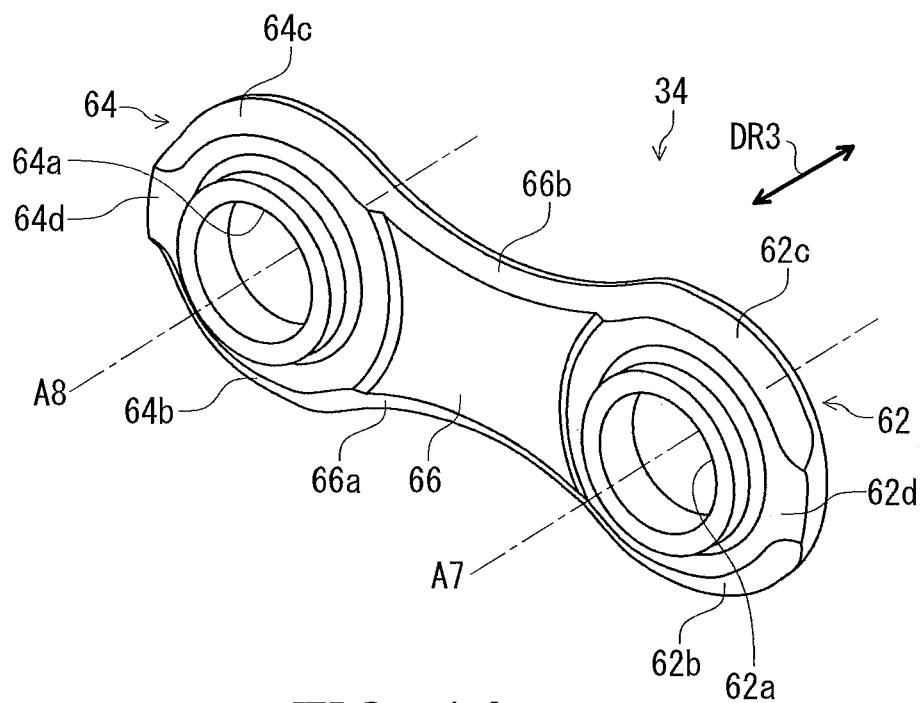
FIG. 14 is an inside perspective view of the second inner link plate illustrated in FIG. 13.

Referring to FIGS. 13 and 14, the seventh end portion 62 of the second inner link plate 34 includes a ninth chamfered section 62c, an eleventh chamfered section 62b, and a fifth chamfer-free section 62d. The ninth chamfered section 62c extends along an outer periphery of the seventh end portion 62. The eleventh chamfered section 62b extends along the outer periphery of the seventh end portion 62 and is provided on an opposite side of the ninth chamfered section 62c with respect to the seventh center axis A7. In the illustrated embodiment, the ninth chamfered section 62c and the eleventh chamfered section 62b have a substantially arc shape extending about the seventh opening 62a. The fifth chamfer-free section 62d is free from being chamfered. The fifth chamfer-free section 62d extends along the outer periphery of the seventh end portion 62 between the ninth chamfered section 62c and the eleventh chamfered section 62b. In the illustrated embodiment, the ninth chamfered section 62c and the eleventh chamfered section 62b have a substantially arc shape extending about the seventh opening 62a.

The eighth end portion 64 includes a tenth chamfered section 64b, a twelfth chamfered section 64c, and a sixth chamfer-free section 64d. The tenth chamfered section 64b extends along an outer periphery of the eighth end portion 64. The twelfth chamfered section 64c extends along the outer periphery of the eighth end portion 64 and is provided on an opposite side of the tenth chamfered section 64b with respect to the eighth center axis A8. In the illustrated embodiment, the tenth chamfered section 64b and the twelfth chamfered section 64c have a substantially arc shape extending about the eighth opening 64a. The sixth chamfer-free section 64d is free from being chamfered. The sixth chamfer-free section 64d extends along the outer periphery of the eighth end portion 64 between the tenth chamfered section 64b and the twelfth chamfered section 64c. In the illustrated embodiment, the tenth chamfered section 64b and the twelfth chamfered section 64c have a substantially arc shape extending about the eighth opening 64a.

The fourth intermediate portion 66 includes fourth intermediate chamfered sections 66a and 66b. The fourth intermediate chamfered sections 66a and 66b have a substantially arc shape and extend along the fourth intermediate portion 66 from the seventh end portion 62 to the eighth end portion 64. The fourth intermediate chamfered section 66a is provided between the tenth chamfered section 64b and the eleventh chamfered section 62b. The fourth intermediate chamfered section 66b is provided between the ninth chamfered section 62c and the twelfth chamfered section 64c.

Figure 15:
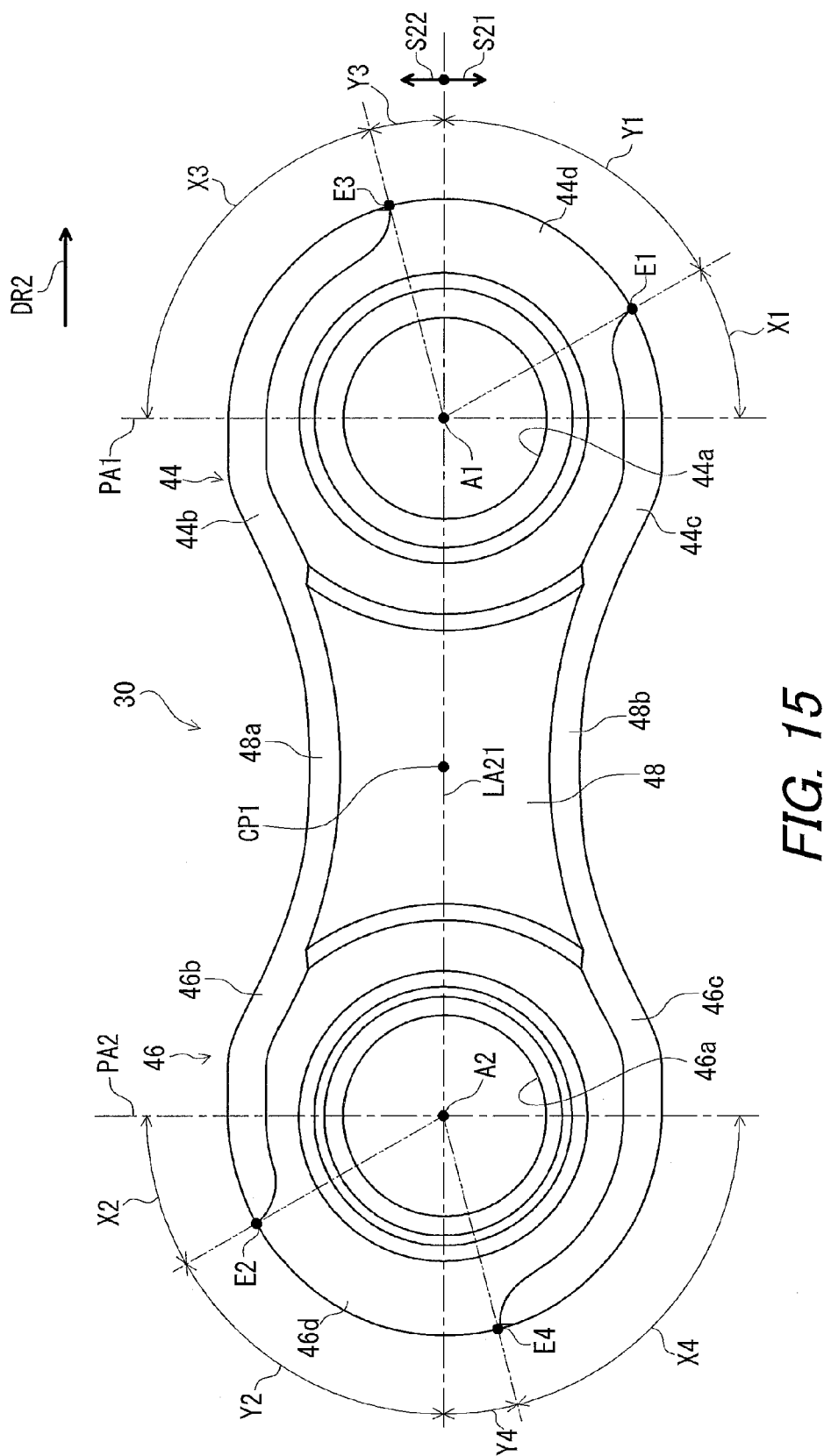
FIG. 15 is an outside elevational view of the first inner link plate.

Referring to FIG. 15, the first inner link plate 30 has a first inner-link longitudinal centerline LA21 perpendicular to the first center axis A1 and the second center axis A2 when viewed from the axial direction DR3 parallel to the first center axis A1. The first inner link plate 30 extends along the first inner-link longitudinal centerline LA21. The first inner link plate 30 is asymmetrical with respect to the first inner-link longitudinal centerline LA21 when viewed from the axial direction DR3 of the bicycle chain 12. However, it will be apparent to those skilled in the bicycle field that the first inner link plate 30 can be symmetrical with respect to the first inner-link longitudinal centerline LA21.

As illustrated in FIG. 15, a first center point CP1 is defined on the first inner-link longitudinal centerline LA21 of the first inner link plate 30. The first center point CP1 is provided at a center position between the first center axis A1 and the second center axis A2. The first inner link plate 30 is symmetrical with respect to the first center point CP1 when viewed from the axial direction DR3. The first end portion 44 and the second end portion 46 are symmetrical with respect to the first center point CP1. The third chamfered section 44b and the fourth chamfered section 46c are symmetrical with respect to the first center point CP1. The first chamfered section 44c and the second chamfered section 46b are symmetrical with respect to the first center point CP1. The first intermediate chamfered section 48a and the first intermediate chamfered section 48b are symmetrical with respect to the first center point CP1. However, it will be apparent to those skilled in the bicycle field that the first inner link plate 30 can be asymmetrical with respect to the first center point CP1.

Referring to FIG. 15, the first chamfered section 44c is provided in at least a first chamfer angular range X1 when viewed from the axial direction DR3. The first chamfer angular range X1 is defined from a first circumferential end E1 of the first chamfered section 44c to a first perpendicular axis PA1. The first perpendicular axis PA1 is perpendicular to the first inner-link longitudinal centerline LA21 and the first center axis A1 when viewed from the axial direction DR3. In the illustrated embodiment, the first chamfered section 44c extends from the first intermediate chamfered section 48b to the first circumferential end E1.

For example, the first chamfer angular range X1 is equal to or greater than 20 degrees with respect to the first center axis A1. Furthermore, the first chamfer angular range X1 is equal to or smaller than 30 degrees with respect to the first center axis A1. In the illustrated embodiment, the first chamfer angular range X1 is 29.8 degrees with respect to the first center axis A1. However, it will be apparent to those skilled in the bicycle field from the present disclosure that the first chamfer angular range X1 can be greater than 30 degrees with respect to the first center axis A1.

As illustrated in FIG. 15, the first chamfer-free section 44d extends along the outer periphery of the first end portion 44 from the first circumferential end E1 of the first chamfered section 44c. The first chamfer-free section 44d is provided in at least a first chamfer-free angular range Y1 when viewed from the axial direction DR3 parallel to the first center axis A1. The first chamfer-free angular range Y1 is defined from the first circumferential end E1 of the first chamfered section 44c to the first inner-link longitudinal centerline LA21 of the first inner link plate 30.

The first chamfer-free angular range Y1 is equal to or greater than 30 degrees with respect to the first center axis A1. The first chamfer-free angular range Y1 is preferably equal to or greater than 45 degrees with respect to the first center axis A1. The first chamfer-free angular range Y1 is preferably equal to or greater than 60 degrees with respect to the first center axis A1. In the illustrated embodiment, the first chamfer-free angular range Y1 is 60.2 degrees with respect to the first center axis A1.

As illustrated in FIG. 15, the second chamfered section 46b is provided in at least a second chamfer angular range X2 when viewed from the axial direction DR3. The second chamfer angular range X2 is defined from a second circumferential end E2 of the second chamfered section 46b to a second perpendicular axis PA2. The second perpendicular axis PA2 is perpendicular to the first inner-link longitudinal centerline LA21 and the second center axis A2 when viewed from the axial direction DR3. In the illustrated embodiment, the second chamfered section 46b extends from the first intermediate chamfered section 48a to the second circumferential end E2.

For example, the second chamfer angular range X2 is equal to or greater than 20 degrees with respect to the second center axis A2. Furthermore, the second chamfer angular range X2 is equal to or smaller than 30 degrees with respect to the second center axis A2. In the illustrated embodiment, the second chamfer angular range X2 is 29.8 degrees with respect to the second center axis A2. However, it will be apparent to those skilled in the bicycle field from the present disclosure that the second chamfer angular range X2 can be greater than 30 degrees with respect to the second center axis A2.

As illustrated in FIG. 15, the second chamfer-free section 46d extends along the outer periphery of the second end portion 46 from the second circumferential end E2 of the second chamfered section 46b. The second chamfer-free section 46d is provided in at least a second chamfer-free angular range Y2 when viewed from the axial direction DR3. The second chamfer-free angular range Y2 is defined from the second circumferential end E2 of the second chamfered section 46b to the first inner-link longitudinal centerline LA21 when viewed from the axial direction DR3.

The second chamfer-free angular range Y2 is equal to or greater than 30 degrees with respect to the second center axis A2. The second chamfer-free angular range Y2 is preferably equal to or greater than 45 degrees with respect to the second center axis A2. The second chamfer-free angular range Y2 is preferably equal to or greater than 60 degrees with respect to the second center axis A2. In the illustrated embodiment, the second chamfer-free angular range Y2 is 60.2 degrees with respect to the second center axis A2.

Since the first inner link plate 30 is symmetrical with respect to the second center point CP2, the second chamfer angular range X2 has an angle equal to the angle of the first chamfer angular range X1. Similarly, the second chamfer-free angular range Y2 has an angle equal to the angle of the first chamfer-free angular range Y1.

As illustrated in FIG. 15, the third chamfered section 44b extends along the outer periphery of the first end portion 44 and provided on an opposite side of the first chamfered section 44c with respect to the first inner-link longitudinal centerline LA21. The third chamfered section 44b is provided in at least a third chamfer angular range X3 when viewed from the axial direction DR3. The third chamfer angular range X3 is defined from a third circumferential end E3 of the third chamfered section 44b to the first perpendicular axis PA1. In the illustrated embodiment, the third chamfered section 44b extends from the first intermediate chamfered section 48a to the third circumferential end E3. In the illustrated embodiment, the third chamfer angular range X3 is 75 degrees with respect to the first center axis A1. However, it will be apparent to those skilled in the bicycle field from the present disclosure that the third chamfer angular range X3 can be greater than 75 degrees or smaller than 75 degrees with respect to the first center axis A1.

As illustrated in FIG. 15, the first chamfer-free section 44d extends along the outer periphery of the first end portion 44 from the first circumferential end E1 of the first chamfered section 44c to the third circumferential end E3 of the third chamfered section 44b. The first chamfer-free section 44d is provided in at least a third chamfer-free angular range Y3 when viewed from the axial direction DR3. The third chamfer-free angular range Y3 is defined from the third circumferential end E3 of the third chamfered section 44b to the first inner-link longitudinal centerline LA21 when viewed from the axial direction DR3.

The third chamfer-free angular range Y3 has an angle different from an angle of the first chamfer-free angular range Y1. The third chamfer-free angular range Y3 has an angle smaller than an angle of the first chamfer-free angular range Y1. However, it will be apparent to those skilled in the bicycle field from the present disclosure that the third chamfer-free angular range Y3 can have an angle equal to the angle of the first chamfer-free angular range Y1. It will be apparent to those skilled in the bicycle field from the present disclosure that the third chamfer-free angular range Y3 can have an angle greater than the angle of the first chamfer-free angular range Y1. In the illustrated embodiment, the third chamfer-free angular range Y3 is 15 degrees with respect to the first center axis A1.

As illustrated in FIG. 15, the fourth chamfered section 46c extends along the outer periphery of the second end portion 46 and is provided on an opposite side of the second chamfered section 46b with respect to the first inner-link longitudinal centerline LA21. The fourth chamfered section 46c is provided in at least a fourth chamfer angular range X4 when viewed from the axial direction DR3. The fourth chamfer angular range X4 is defined from a fourth circumferential end E4 of the fourth chamfered section 46c to the second perpendicular axis PA2. In the illustrated embodiment, the fourth chamfer angular range X4 is 75 degrees with respect to the second center axis A2. However, it will be apparent to those skilled in the bicycle field from the present disclosure that the fourth chamfer angular range X4 can be greater than 75 degrees or smaller than 75 degrees with respect to the second center axis A2.

As illustrated in FIG. 15, the second chamfer-free section 46d extends along the outer periphery of the second end portion 46 from the second circumferential end E2 of the second chamfered section 46b to the fourth circumferential end E4 of the fourth chamfered section 46c. The second chamfer-free section 46d is provided in at least a fourth chamfer-free angular range Y4 when viewed from the axial direction DR3. The fourth chamfer-free angular range Y4 is defined from the fourth circumferential end E4 of the fourth chamfered section 46c to the first inner-link longitudinal centerline LA21 when viewed from the axial direction DR3.

Since the first inner link plate 30 is symmetrical with respect to the first center point CP1, the fourth chamfer angular range X4 has an angle equal to the angle of the third chamfer angular range X3. Similarly, the fourth chamfer-free angular range Y4 has an angle equal to the angle of the third chamfer-free angular range Y3.

The fourth chamfer-free angular range Y4 has an angle different from an angle of the second chamfer-free angular range Y2. The fourth chamfer-free angular range Y4 has an angle smaller than an angle of the second chamfer-free angular range Y2. In the illustrated embodiment, the fourth chamfer-free angular range Y4 is 15 degrees with respect to the second center axis A2.

As illustrated in FIG. 15, the first inner link plate 30 has a first side S21 and a second side S22 which is opposite to the first side S21 with respect to the first inner-link longitudinal centerline LA21. The first chamfer-free angular range Y1 is defined on the first side S21 of the first inner link plate 30 with respect to the first inner-link longitudinal centerline LA21. The fourth chamfer-free angular range Y4 is defined on the first side S21 of the first inner link plate 30 with respect to the first inner-link longitudinal centerline LA21. The second chamfer-free angular range Y2 is defined on the second side S22 of the first inner link plate 30 with respect to the first inner-link longitudinal centerline LA21. The third chamfer-free angular range Y3 is defined on the second side S22 of the first inner link plate 30 with respect to the first inner-link longitudinal centerline LA21. Furthermore, the first chamfer angular range X1 and the fourth chamfer angular range X4 are defined on the first side S21 of the first inner link plate 30 with respect to the first inner-link longitudinal centerline LA21. The second chamfer angular range X2 and the third chamfer angular range X3 are defined on the second side S22 of the first inner link plate 30. The first side S21 is provided closer to the rotation axis AR of the bicycle sprocket 18 than the second side S22 in a state where the bicycle chain 12 engages with the bicycle sprocket 18 (FIGS. 1 and 2).

Figure 16:
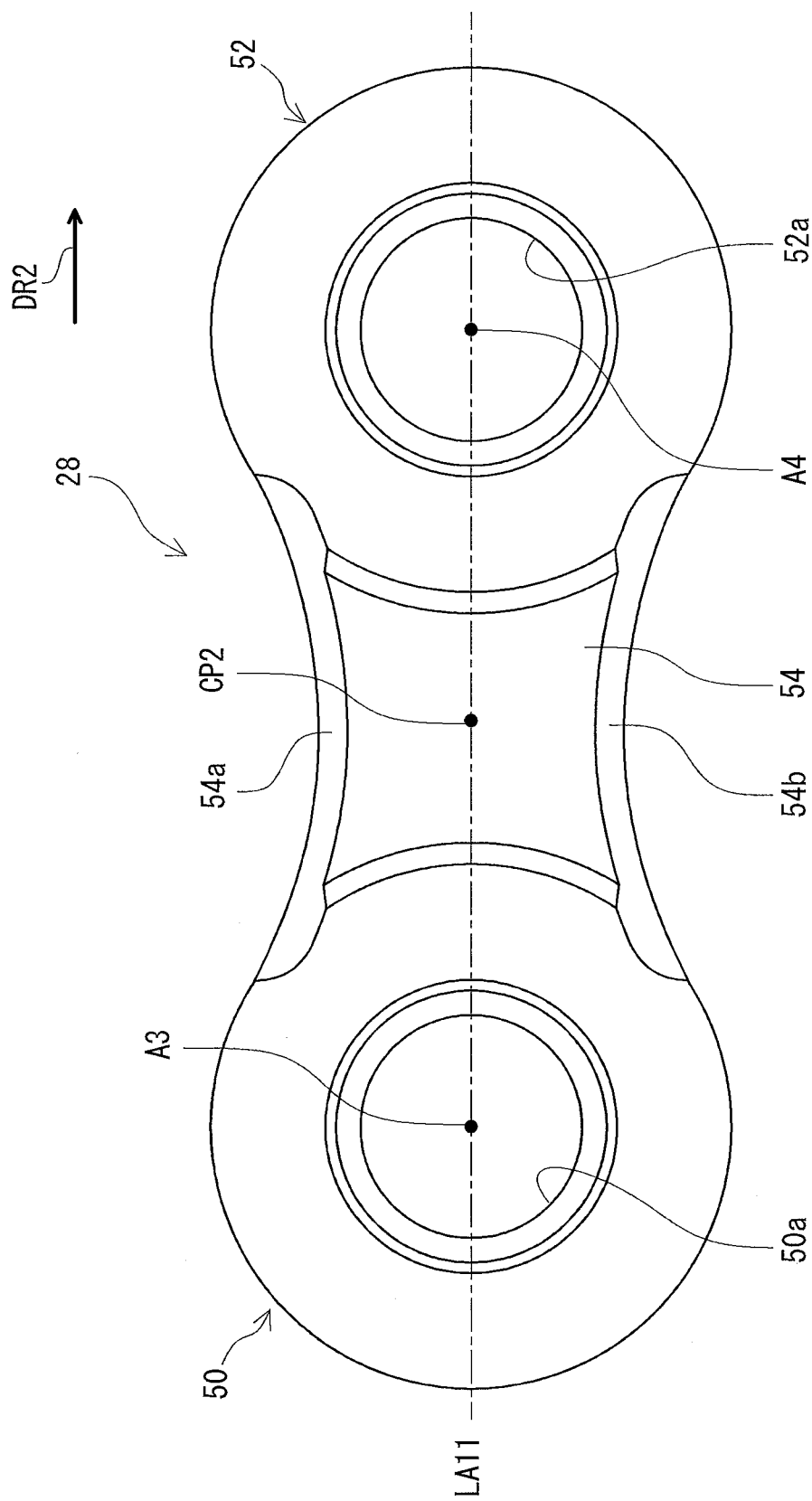
FIG. 16 is an outside elevational view of the first outer link plate.

Referring to FIG. 16, the first outer link plate 28 has a first outer-link longitudinal centerline LA11 perpendicular to the third center axis A3 and the fourth center axis A4. The first outer-link longitudinal centerline LA11 is defined at a center of the first outer link plate 28 in a direction defined along the third center axis A3 and the fourth center axis A4. The first outer link plate 28 extends along the first outer-link longitudinal centerline LA11. The first outer link plate 28 is symmetrical with respect to the first outer-link longitudinal centerline LA11 when viewed from a direction parallel to the third center axis A3 and the fourth center axis A4. However, it will be apparent to those skilled in the bicycle field that the first outer link plate 28 can be asymmetrical with respect to the first outer-link longitudinal centerline LA11.

As illustrated in FIG. 16, a second center point CP2 is defined on the first outer-link longitudinal centerline LA11 of the first outer link plate 28. The second center point CP2 is provided at a center position between the third center axis A3 and the fourth center axis A4. The first outer link plate 28 is symmetrical with respect to the second center point CP2 when viewed from the direction parallel to the third center axis A3 and the fourth center axis A4. However, it will be apparent to those skilled in the bicycle field that the first outer link plate 28 can be asymmetrical with respect to the second center point CP2.

Figure 17:
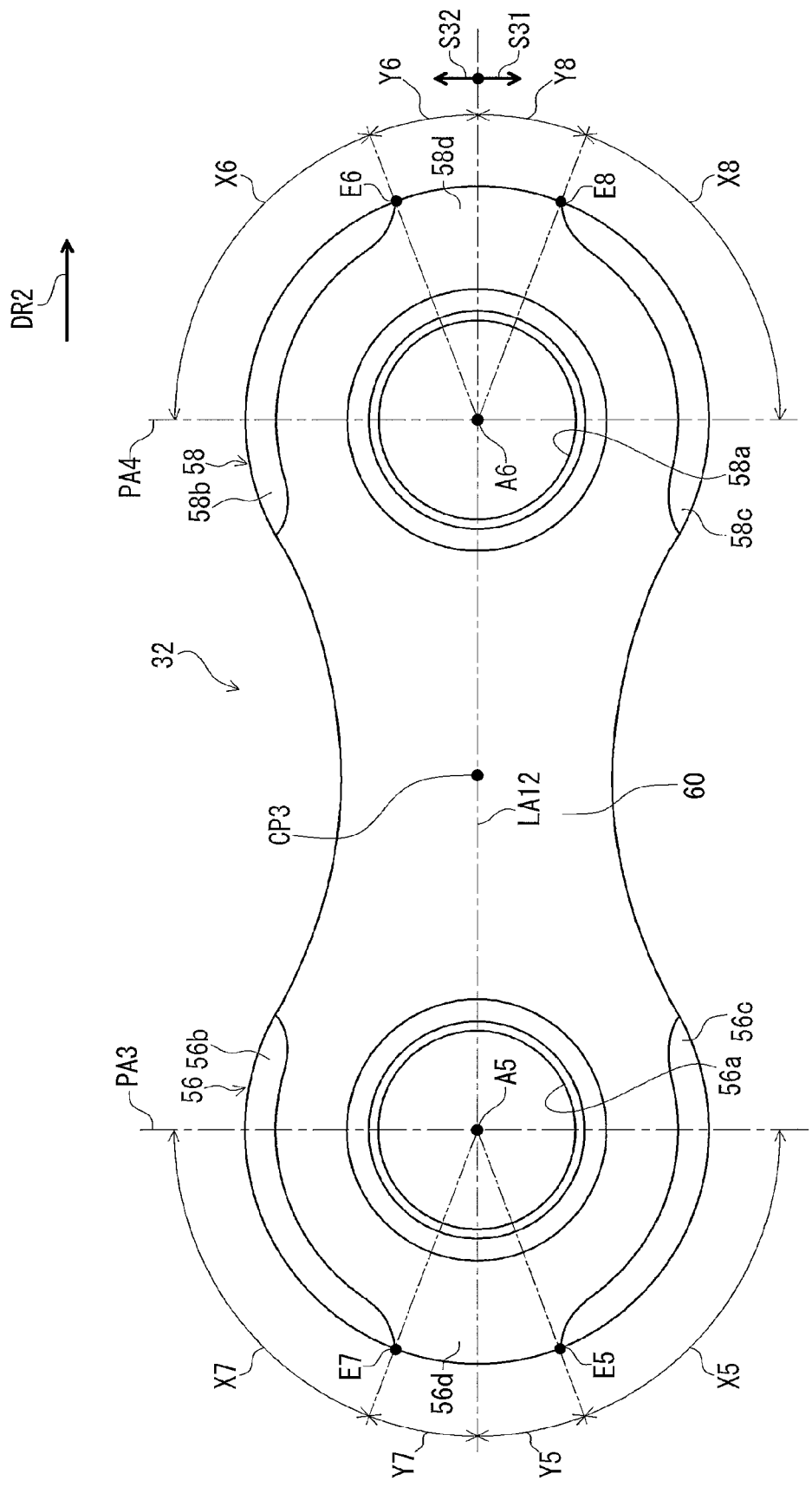
FIG. 17 is an outside elevational view of the second outer link plate.

Referring to FIG. 17, the second outer link plate 32 has a second outer-link longitudinal centerline LA12 perpendicular to the fifth center axis A5 and the sixth center axis A6. The second outer link plate 32 extends along the second outer-link longitudinal centerline LA12. The second outer link plate 32 is symmetrical with respect to the second outer-link longitudinal centerline LA12 when viewed from the axial direction DR3. However, it will be apparent to those skilled in the bicycle field that the second outer link plate 32 can be asymmetrical with respect to the second outer-link longitudinal centerline LA12. The axial direction DR3 of the bicycle chain 12 can be defined to be parallel to the fifth center axis A5 and the sixth center axis A6 in the second outer link plate 32.

As illustrated in FIG. 17, a third center point CP3 is defined on the second outer-link longitudinal centerline LA12 of the second outer link plate 32. The third center point CP3 is provided at a center position between the fifth center axis A5 and the sixth center axis A6. The second outer link plate 32 is symmetrical with respect to the third center point CP3 when viewed from the axial direction DR3. However, it will be apparent to those skilled in the bicycle field that the second outer link plate 32 can be asymmetrical with respect to the third center point CP3.

Referring to FIG. 17, the fifth chamfered section 56c is provided in at least a fifth chamfer angular range X5 when viewed from the axial direction DR3. The fifth chamfer angular range X5 is defined from a fifth circumferential end E5 of the fifth chamfered section 56c to a third perpendicular axis PA3. The third perpendicular axis PA3 is perpendicular to the second outer-link longitudinal centerline LA12 and the fifth center axis A5 when viewed from the axial direction DR3. In the illustrated embodiment, the fifth chamfered section 56c extends from the third intermediate portion 60 to the fifth circumferential end E5.

As illustrated in FIG. 17, the fifth chamfer angular range X5 has an angle which is greater than an angle of the first chamfer angular range X1 and which is smaller than an angle of the third chamfer angular range X3. In the illustrated embodiment, the fifth chamfer angular range X5 is 69 degrees with respect to the fifth center axis A5.

As illustrated in FIG. 17, the third chamfer-free section 56d extends along the outer periphery of the fifth end portion 56 from the fifth circumferential end E5 of the fifth chamfered section 56c. The third chamfer-free section 56d is provided in at least a fifth chamfer-free angular range Y5 when viewed from the axial direction DR3 parallel to the fifth center axis A5. The fifth chamfer-free angular range Y5 is defined from the fifth circumferential end E5 of the fifth chamfered section 56c to the second outer-link longitudinal centerline LA12 of the second inner link plate 34. In the illustrated embodiment, the fifth chamfer-free angular range Y5 has an angle which is smaller than an angle of the first chamfer-free angular range Y1 and which is greater than an angle of the third chamfer-free angular range Y3 (FIG. 15). In the illustrated embodiment, the fifth chamfer-free angular range Y5 is 21 degrees with respect to the fifth center axis A5.

As illustrated in FIG. 17, the sixth chamfered section 58b is provided in at least a sixth chamfer angular range X6 when viewed from the axial direction DR3. The sixth chamfer angular range X6 is defined from a sixth circumferential end E6 of the sixth chamfered section 58b to a fourth perpendicular axis PA4. The fourth perpendicular axis PA4 is perpendicular to the second outer-link longitudinal centerline LA12 and the sixth center axis A6 when viewed from the axial direction DR3. In the illustrated embodiment, the sixth chamfered section 58b extends from the third intermediate portion 60 to the sixth circumferential end E6.

As illustrated in FIG. 17, the sixth chamfer angular range X6 has an angle which is greater than an angle of the second chamfer angular range X2 and which is smaller than an angle of the fourth chamfer angular range X4. In the illustrated embodiment, the sixth chamfer angular range X6 is 69 degrees with respect to the sixth center axis A6.

As illustrated in FIG. 17, the fourth chamfer-free section 58d extends along the outer periphery of the sixth end portion 58 from the sixth circumferential end E6 of the sixth chamfered section 58b. The fourth chamfer-free section 58d is provided in at least a sixth chamfer-free angular range Y6 when viewed from the axial direction DR3 parallel to the fifth center axis A5. The sixth chamfer-free angular range Y6 is defined from the sixth circumferential end E6 of the fifth chamfered section 56c to the second outer-link longitudinal centerline LA12 of the second outer link plate 32. In the illustrated embodiment, the sixth chamfer-free angular range Y6 has an angle which is smaller than an angle of the second chamfer-free angular range Y2 and which is greater than an angle of the fourth chamfer-free angular range Y4 (FIG. 15). In the illustrated embodiment, the sixth chamfer-free angular range Y6 is 21 degrees with respect to the sixth center axis A6.

As illustrated in FIG. 17, the seventh chamfered section 56b extends along the outer periphery of the fifth end portion 56 and provided on an opposite side of the fifth chamfered section 56c with respect to the second outer-link longitudinal centerline LA12. The seventh chamfered section 56b is provided in at least a seventh chamfer angular range X7 when viewed from the axial direction DR3. The seventh chamfer angular range X7 is defined from a seventh circumferential end E7 of the seventh chamfered section 56b to the third perpendicular axis PA3. In the illustrated embodiment, the seventh chamfer angular range X7 has an angle which is greater than an angle of the first chamfer angular range X1 and which is smaller than an angle of the third chamfer angular range X3. In the illustrated embodiment, the seventh chamfer angular range X7 is 69 degrees with respect to the fifth center axis A5.

As illustrated in FIG. 17, the third chamfer-free section 56d extends along the outer periphery of the fifth end portion 56 from the fifth circumferential end E5 of the fifth chamfered section 56c to the seventh circumferential end E7 of the seventh chamfered section 56b. The third chamfer-free section 56d is provided in at least a seventh chamfer-free angular range Y7 when viewed from the axial direction DR3. The seventh chamfer-free angular range Y7 is defined from the seventh circumferential end E7 of the seventh chamfered section 56b to the second outer-link longitudinal centerline LA12 when viewed from the axial direction DR3. In the illustrated embodiment, the seventh chamfer-free angular range Y7 has an angle which is smaller than an angle of the first chamfer-free angular range Y1 and which is greater than an angle of the third chamfer-free angular range Y3. In the illustrated embodiment, the seventh chamfer-free angular range Y7 is 21 degrees with respect to the fifth center axis A5.

As illustrated in FIG. 17, the eighth chamfered section 58c extends along the outer periphery of the sixth end portion 58 and is provided on an opposite side of the sixth chamfered section 58b with respect to the second outer-link longitudinal centerline LA12. The eighth chamfered section 58c is provided in at least an eighth chamfer angular range X8 when viewed from the axial direction DR3. The eighth chamfer angular range X8 is defined from an eighth circumferential end E8 of the eighth chamfered section 58c to the fourth perpendicular axis PA4. In the illustrated embodiment, the eighth chamfer angular range X8 has an angle which is greater than an angle of the second chamfer angular range X2 and which is smaller than an angle of the fourth chamfer angular range X4. In the illustrated embodiment, the eighth chamfer angular range X8 is 69 degrees with respect to the sixth center axis A6.

As illustrated in FIG. 17, the fourth chamfer-free section 58d extends along the outer periphery of the sixth end portion 58 from the sixth circumferential end E6 of the sixth chamfered section 58b to the eighth circumferential end E8 of the eighth chamfered section 58c. The fourth chamfer-free section 58d is provided in at least an eighth chamfer-free angular range Y8 when viewed from the axial direction DR3. The eighth chamfer-free angular range Y8 is defined from the eighth circumferential end E8 of the eighth chamfered section 58c to the second outer-link longitudinal centerline LA12 when viewed from the axial direction DR3. In the illustrated embodiment, the eighth chamfer-free angular range Y8 has an angle which is smaller than an angle of the second chamfer-free angular range Y2 and which is greater than an angle of the fourth chamfer-free angular range Y4. In the illustrated embodiment, the eighth chamfer-free angular range Y8 is 21 degrees with respect to the sixth center axis A6.

As illustrated in FIG. 17, the second outer link plate 32 has a first side S31 and a second side S32 which is opposite to the first side S31 with respect to the second outer-link longitudinal centerline LA12. The fifth chamfer-free angular range Y5 and the eighth chamfer-free angular range Y8 are defined on the first side S31 of the second outer link plate 32 with respect to the second outer-link longitudinal centerline LA12. The sixth chamfer-free angular range Y6 and the seventh chamfer-free angular range Y7 are defined on the second side S32 of the second outer link plate 32. Furthermore, the fifth chamfer angular range X5 and the eighth chamfer angular range X8 are defined on the first side S31 of the second outer link plate 32 with respect to the second outer-link longitudinal centerline LA12. The sixth chamfer angular range X6 and the seventh chamfer angular range X7 are defined on the second side S32 of the second outer link plate 32. The first side S31 is provided closer to the rotation axis AR of the bicycle sprocket 18 than the second side S32 in a state where the bicycle chain 12 engages with the bicycle sprocket 18 (FIGS. 1 and 2).

Figure 18:
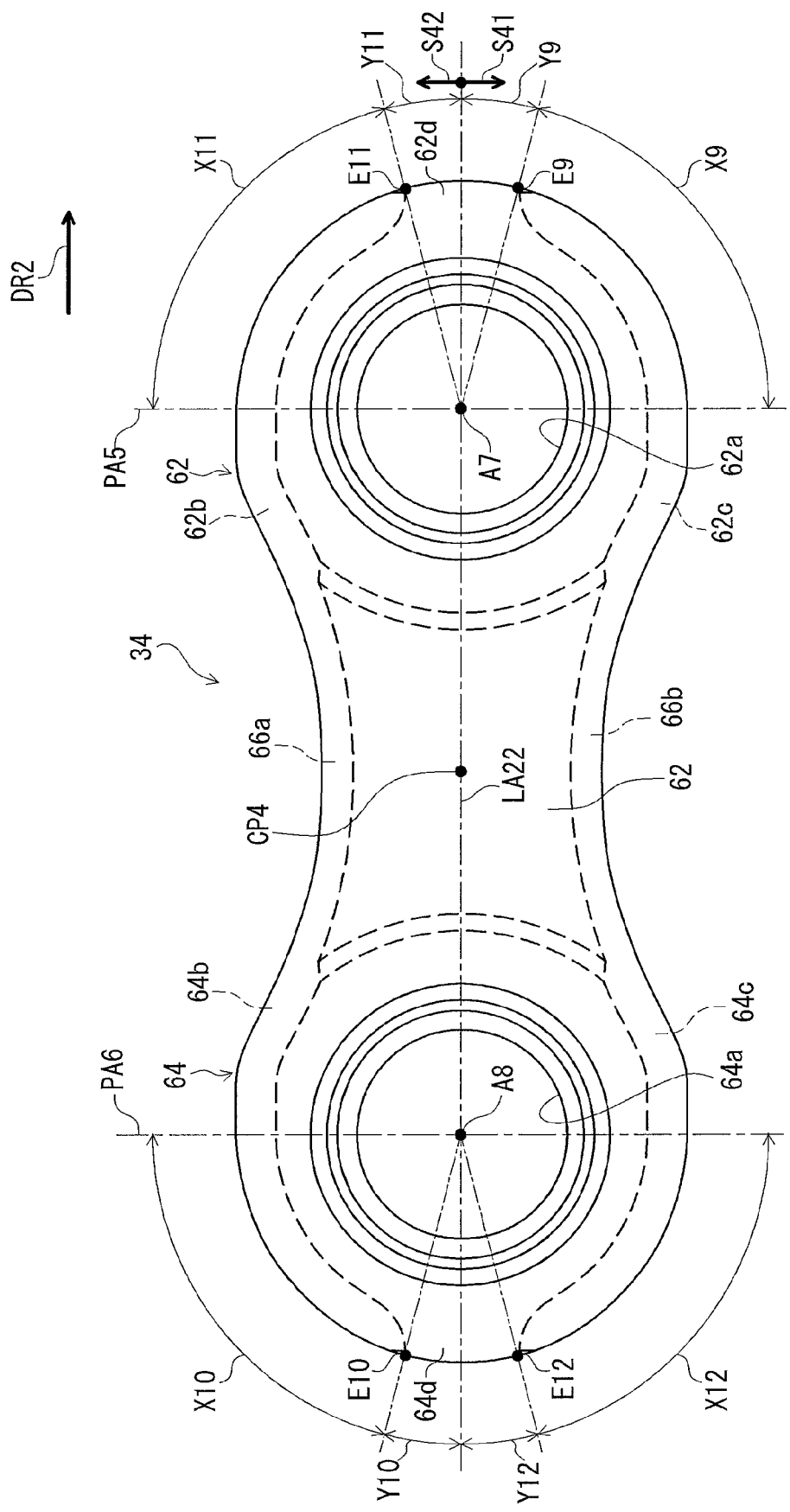
FIG. 18 is an outside elevational view of the second inner link plate.

Referring to FIG. 18, the second inner link plate 34 has a second inner-link longitudinal centerline LA22 perpendicular to the seventh center axis A7 and the eighth center axis A8. The second inner link plate 34 extends along the second inner-link longitudinal centerline LA22. The second inner link plate 34 is symmetrical with respect to the second inner-link longitudinal centerline LA22 when viewed from the axial direction DR3. The axial direction DR3 of the bicycle chain 12 can be defined to be parallel to the seventh center axis A7 and the eighth center axis A8 in the second inner link plate 34. It will be apparent to those skilled in the bicycle field that the second inner link plate 34 can be asymmetrical with respect to the second inner-link longitudinal centerline LA22.

As illustrated in FIG. 18, a fourth center point CP4 is defined on the second inner-link longitudinal centerline LA22 of the second inner link plate 34. The fourth center point CP4 is provided at a center position between the seventh center axis A7 and the eighth center axis A8. The second inner link plate 34 has a symmetrical shape with respect to the fourth center point CP4 when viewed from the axial direction DR3. However, it will be apparent to those skilled in the bicycle field that the second inner link plate 34 can be asymmetrical with respect to the fourth center point CP4.

Referring to FIG. 18, the ninth chamfered section 62c is provided in at least a ninth chamfer angular range X9 when viewed from the axial direction DR3. The ninth chamfer angular range X9 is defined from a ninth circumferential end E9 of the ninth chamfered section 62c to a fifth perpendicular axis PA5. The fifth perpendicular axis PA5 is perpendicular to the second inner-link longitudinal centerline LA22 and the seventh center axis A7 when viewed from the axial direction DR3. The ninth chamfered section 62c extends from the fourth intermediate chamfered section 66b to the ninth circumferential end E9. In the illustrated embodiment, the ninth chamfer angular range X9 has an angle greater than the angle of the first chamfer angular range X1 (FIG. 15). The ninth chamfer angular range X9 is 15 degrees with respect to the seventh center axis A7, for example.

As illustrated in FIG. 18, the fifth chamfer-free section 62d extends along the outer periphery of the seventh end portion 62 from the ninth circumferential end E9 of the ninth chamfered section 62c. The fifth chamfer-free section 62d is provided in at least a ninth chamfer-free angular range Y9 when viewed from the axial direction DR3 parallel to the seventh center axis A7. The ninth chamfer-free angular range Y9 is defined from the ninth circumferential end E9 of the ninth chamfered section 62c to the second inner-link longitudinal centerline LA22 of the second inner link plate 34. In the illustrated embodiment, the ninth chamfer-free angular range Y9 is smaller than the first chamfer-free angular range Y1 (FIG. 15). The ninth chamfer-free angular range Y9 is 75 degrees with respect to the seventh center axis A7, for example.

As illustrated in FIG. 18, the tenth chamfered section 64b is provided in at least a tenth chamfer angular range X10 when viewed from the axial direction DR3. The tenth chamfer angular range X10 is defined from a tenth circumferential end E10 of the tenth chamfered section 64b to a sixth perpendicular axis PA6. The sixth perpendicular axis PA6 is perpendicular to the second inner-link longitudinal centerline LA22 and the eighth center axis A8 when viewed from the axial direction DR3. The tenth chamfered section 64b extends from the fourth intermediate chamfered section 66a to the tenth circumferential end E10. In the illustrated embodiment, the tenth chamfer angular range X10 has an angle greater than the angle of the second chamfer angular range X2 (FIG. 15). The tenth chamfer angular range X10 is 75 degrees with respect to the eighth center axis A8, for example.

As illustrated in FIG. 18, the sixth chamfer-free section 64d extends along the outer periphery of the second end portion 46 from the tenth circumferential end E10 of the tenth chamfered section 64b. The sixth chamfer-free section 64d is provided in at least a tenth chamfer-free angular range Y10 when viewed from the axial direction DR3. The tenth chamfer-free angular range Y10 is defined from the tenth circumferential end E10 of the tenth chamfered section 64b to the second inner-link longitudinal centerline LA22 when viewed from the axial direction DR3. In the illustrated embodiment, the tenth chamfer-free angular range Y10 has an angle smaller than the angle of the second chamfer-free angular range Y2 (FIG. 15). The tenth chamfer-free angular range Y10 is 15 degrees with respect to the eighth center axis A8.

Since the second inner link plate 34 is symmetrical with respect to the fourth center point CP4, the tenth chamfer angular range X10 has an angle equal to the angle of the ninth chamfer angular range X9. Similarly, the tenth chamfer-free angular range Y10 has an angle equal to the angle of the ninth chamfer-free angular range Y9.

As illustrated in FIG. 18, the eleventh chamfered section 62b extends along the outer periphery of the first end portion 44 and provided on an opposite side of the ninth chamfered section 62c with respect to the second inner-link longitudinal centerline LA22. The eleventh chamfered section 62b is provided in at least an eleventh chamfer angular range X11 when viewed from the axial direction DR3. The eleventh chamfer angular range X11 is defined from an eleventh circumferential end E11 of the eleventh chamfered section 62b to the fifth perpendicular axis PA5. The eleventh chamfered section 62b extends from the fourth intermediate chamfered section 66a to the eleventh circumferential end E11. In the illustrated embodiment, the eleventh chamfer angular range X11 has an angle equal to the angle of the third chamfer angular range X3 (FIG. 15).

As illustrated in FIG. 18, the fifth chamfer-free section 62d extends along the outer periphery of the first end portion 44 from the ninth circumferential end E9 of the ninth chamfered section 62c to the eleventh circumferential end E11 of the eleventh chamfered section 62b. The fifth chamfer-free section 62d is provided in at least an eleventh chamfer-free angular range Y11 when viewed from the axial direction DR3. The eleventh chamfer-free angular range Y11 is defined from the eleventh circumferential end E11 of the eleventh chamfered section 62b to the second inner-link longitudinal centerline LA22 when viewed from the axial direction DR3. In the illustrated embodiment, the eleventh chamfer-free angular range Y11 has an angle equal to the angle of the third chamfer-free angular range Y3 (FIG. 15).

As illustrated in FIG. 18, the twelfth chamfered section 64c extends along the outer periphery of the second end portion 46 and is provided on an opposite side of the tenth chamfered section 64b with respect to the second inner-link longitudinal centerline LA22. The twelfth chamfered section 64c is provided in at least a twelfth chamfer angular range X12 when viewed from the axial direction DR3. The twelfth chamfer angular range X12 is defined from a twelfth circumferential end E12 of the twelfth chamfered section 64c to the sixth perpendicular axis PA6. The twelfth chamfered section 64c extends from the fourth intermediate chamfered section 66b to the twelfth circumferential end E12. In the illustrated embodiment, the twelfth chamfer angular range X12 has an angle equal to the angle of the fourth chamfer angular range X4 (FIG. 15).

As illustrated in FIG. 18, the sixth chamfer-free section 64d extends along the outer periphery of the second end portion 46 from the tenth circumferential end E10 of the tenth chamfered section 64b to the twelfth circumferential end E12 of the twelfth chamfered section 64c. The sixth chamfer-free section 64d is provided in at least a twelfth chamfer-free angular range Y12 when viewed from the axial direction DR3. The twelfth chamfer-free angular range Y12 is defined from the twelfth circumferential end E12 of the twelfth chamfered section 64c to the second inner-link longitudinal centerline LA22 when viewed from the axial direction DR3. The twelfth chamfer-free angular range Y12 has an angle equal to the angle of the fourth chamfer-free angular range Y4 (FIG. 15).

Since the second inner link plate 34 is symmetrical with respect to the fourth center point CP4, the twelfth chamfer angular range X12 has an angle equal to the angle of the eleventh chamfer angular range X11. Similarly, the twelfth chamfer-free angular range Y12 has an angle equal to the angle of the eleventh chamfer-free angular range Y11. Furthermore, since the second inner link plate 34 is symmetrical with respect to the second inner-link longitudinal centerline LA22, the ninth chamfer angular range X9, the tenth chamfer angular range X10, the eleventh chamfer angular range X11, and the twelfth chamfer angular range X12 have the same angles as one another. Similarly, the ninth chamfer-free angular range Y9, the tenth chamfer-free angular range Y10, the eleventh chamfer-free angular range Y11, and the twelfth chamfer-free angular range Y12 have the same angles as one another.

As illustrated in FIG. 18, the second inner link plate 34 has a first side S41 and a second side S42 which is opposite to the first side S41 with respect to the second inner-link longitudinal centerline LA22. The ninth chamfer-free angular range Y9 and the twelfth chamfer-free angular range Y12 are defined on the first side S41 of the first inner link plate 30 with respect to the second inner-link longitudinal centerline LA22. The tenth chamfer-free angular range Y10 and the eleventh chamfer-free angular range Y11 are defined on the second side S42 of the second inner link plate 34. Furthermore, the ninth chamfer angular range X9 and the twelfth chamfer angular range X12 are defined on the first side S41 of the second inner link plate 34 with respect to the second inner-link longitudinal centerline LA22. The tenth chamfer angular range X10 and the eleventh chamfer angular range X11 are defined on the second side S42 of the first inner link plate 30. The first side S41 is provided closer to the rotation axis AR of the bicycle sprocket 18 than the second side S42 in a state where the bicycle chain 12 engages with the bicycle sprocket 18 (FIGS. 1 and 2).

Referring to FIGS. 19 to 22, the operation of the bicycle chain 12 will be described below.

Figure 19:
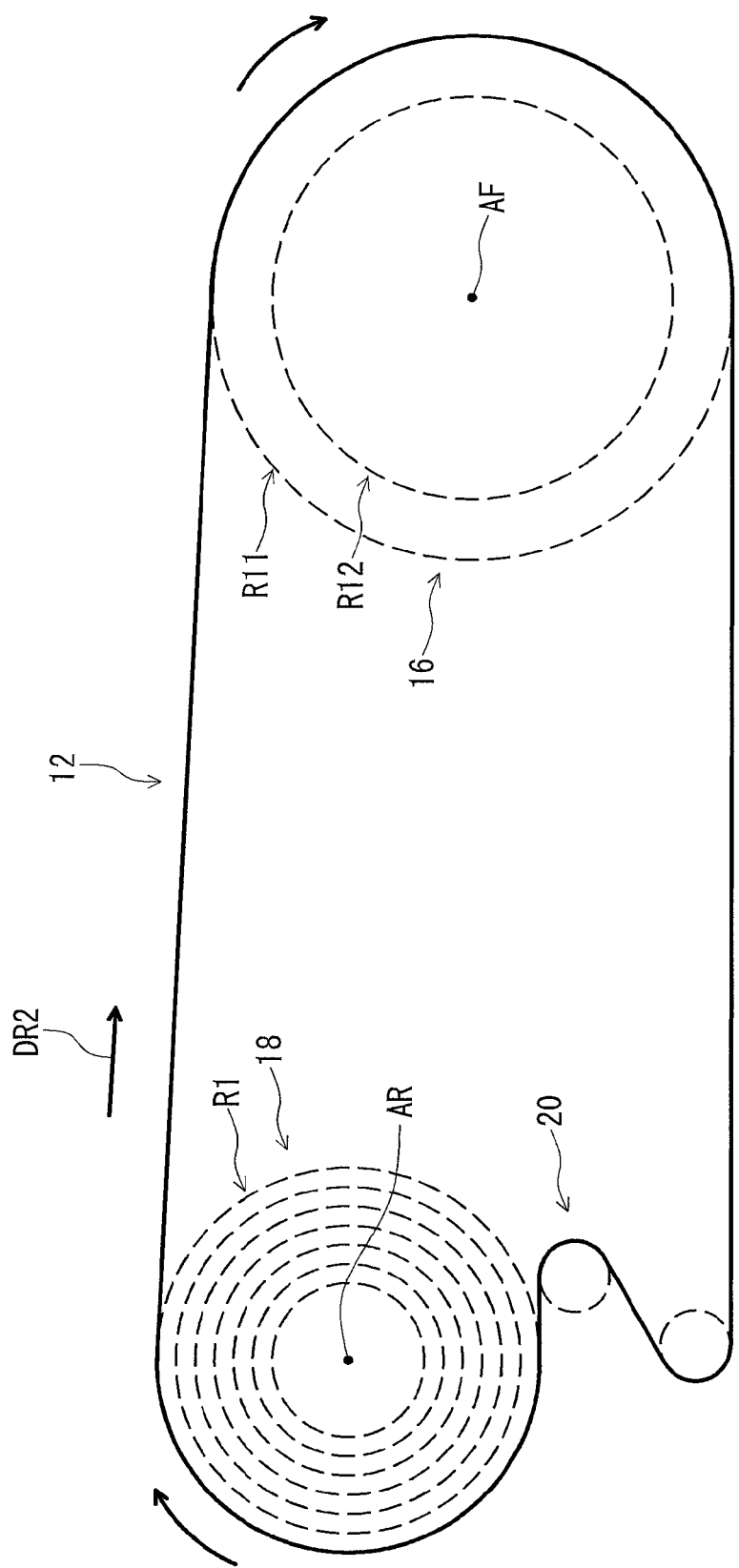
FIG. 19 is a schematic diagram of a drive train of the bicycle illustrated in FIG. 1.

As illustrated in FIG. 19, the front crankset 16 includes a first front sprocket R11 and a second front sprocket R12. The front crankset 16 is rotatable about a front rotation axis AF. The first front sprocket R11 has an outer diameter larger than an outer diameter of the second front sprocket R12. FIG. 19 illustrates the state where the bicycle chain 12 engages with the first front sprocket R11 and the first rear sprocket R1.

Figure 20:
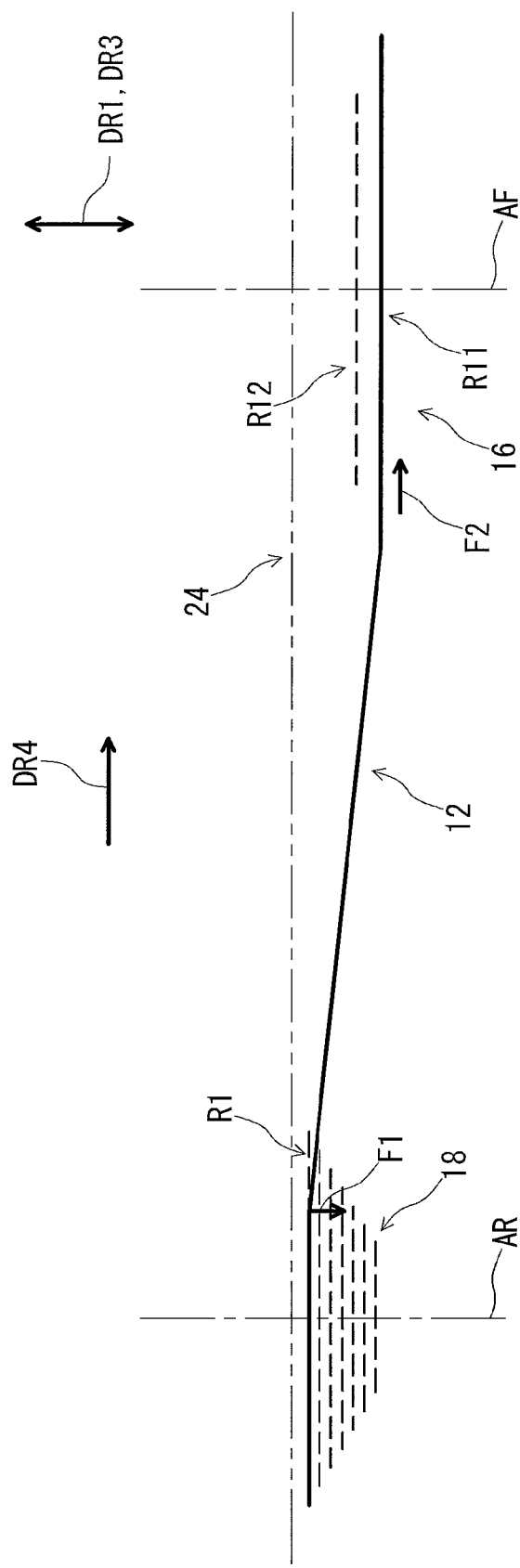
FIG. 20 is a schematic diagram of the drive train of the bicycle illustrated in FIG. 1.

As illustrated in FIG. 20, the first front sprocket R11 is disposed at a position farther from the bicycle frame 24 than the second front sprocket R12 in the transverse direction DR1. The first rear sprocket R1 is disposed at a position closest to the bicycle frame 24 in the transverse direction DR1 in the bicycle sprocket 18. In a state where the bicycle chain 12 engages with the first front sprocket R11 and the first rear sprocket R1, the bicycle chain 12 is inclined with respect to a forward-rearward direction DR4 of the bicycle frame 24 when viewed from the vertical direction of the bicycle frame 24. In this state, an outward force F1 is applied to the part of the bicycle chain 12 engaging with the first rear sprocket R1 when the pedaling force F2 is applied to the bicycle chain 12. When the outward force F1 is applied to the bicycle chain 12, the first inner link plates 30 of the bicycle chain 12 slide with teeth of the first rear sprocket R1 at a released position of the bicycle chain 12.

Figure 21:
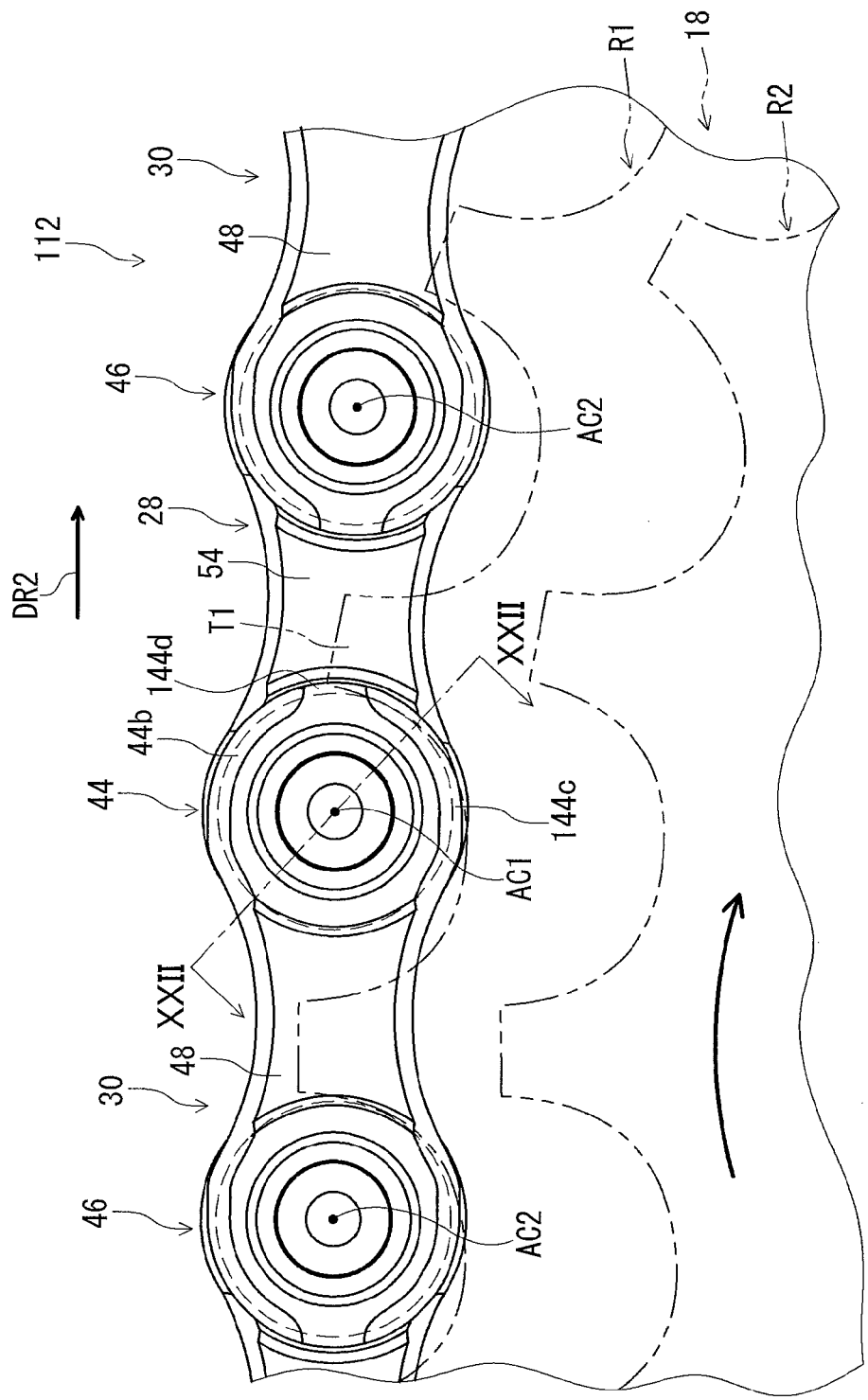
FIG. 21 is a partial schematic diagram of the bicycle sprocket with a comparative example of the bicycle chain.

Referring to FIG. 21, a bicycle chain 112 is illustrated as the comparative example of the bicycle chain 12. In this comparative example, the first end portion 44 of first inner link plate 30 has a first chamfered section 144c and a first chamfer-free section 144d. The first chamfered section 144c corresponds to the first chamfered section 44c; however, the first chamfer angular range X1 has an angle equal to the angle of the third chamfer angular range X3 and is 75 degrees with respect to the first center axis A1, for example. Thus, the first chamfer-free angular range Y1 has an angle equal to the angle of the third chamfer-free angular range Y3 and is 15 degrees with respect to the first center axis A1. With this comparative example, the first chamfered section 144c of the first end portion 44 slides with the tooth T1 of the first rear sprocket R1.

Figure 22:
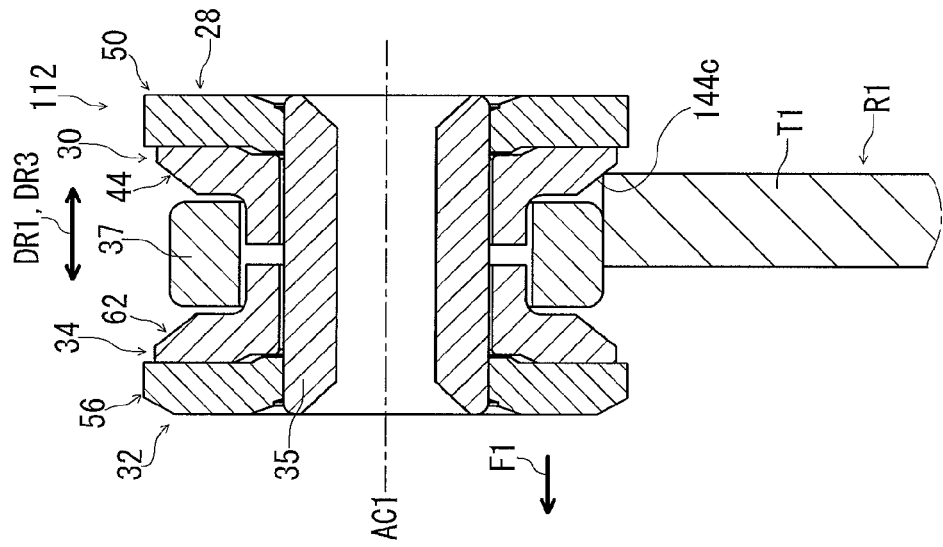
FIG. 22 is a partial cross sectional view of the bicycle sprocket with the comparative example of the bicycle chain taken along line XXII-XXII of FIG. 21.
Figure 23:
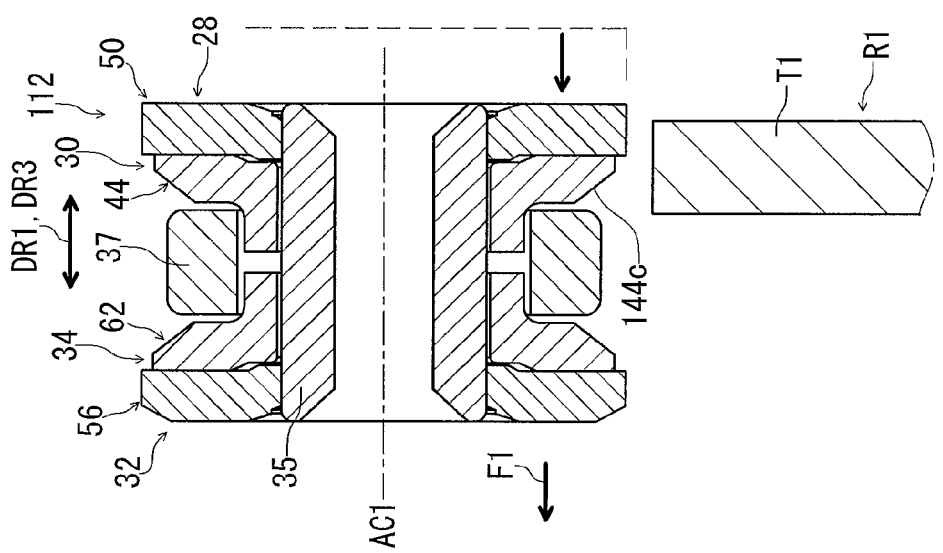
FIG. 23 is a partial cross sectional view of the bicycle sprocket with the comparative example of the bicycle chain at a released position at which a part of the bicycle chain is released from the bicycle sprocket toward a front crankset.

As illustrated in FIGS. 22 and 23, when the bicycle chain 112 is released from the first rear sprocket R1 at the released position, the first chamfered section 144c of the first end portion 44 of the first inner link plate 30 slides with an edge of the tooth T1 of the first rear sprocket R1. In this case, the edge of the tooth T1 is likely to snap as a result of contacting with the bicycle chain 112, causing the undesirable noise from the engaging part of the bicycle chain 112 and the bicycle sprocket 18 during the pedaling.

Figure 24:
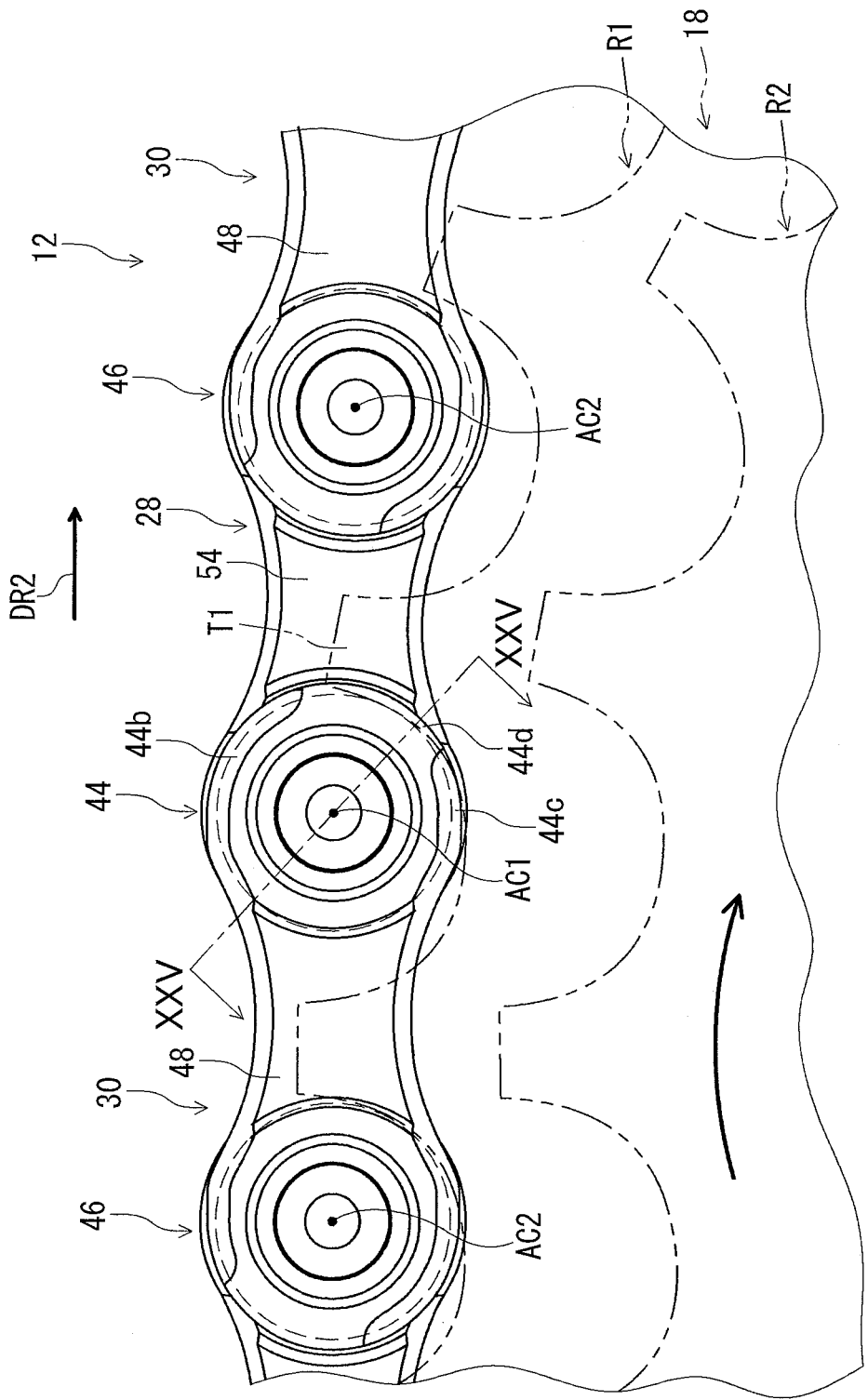
FIG. 24 is a partial schematic diagram of the bicycle sprocket with the bicycle chain illustrated in FIGS. 3 and 4.
Figure 25:
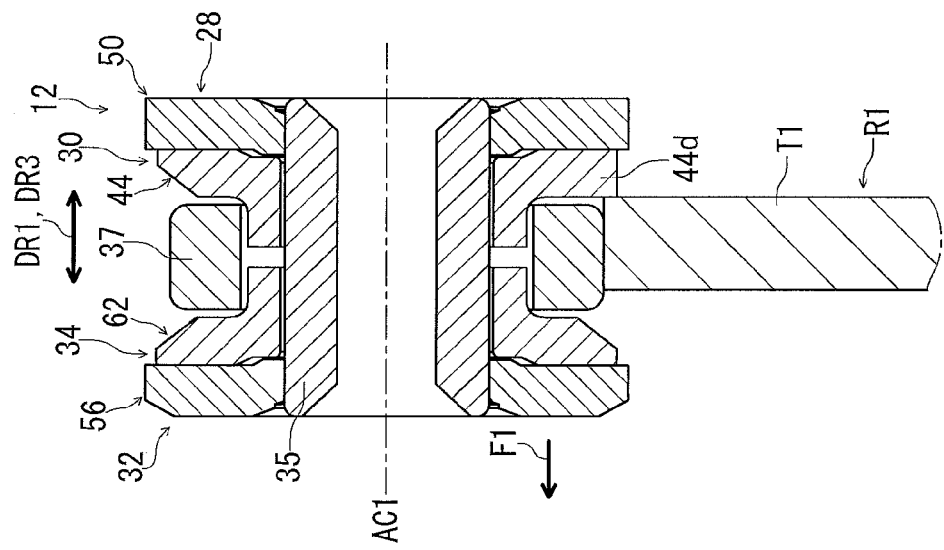
FIG. 25 is a partial cross sectional view of the bicycle sprocket with the bicycle chain taken along line XXV-XXV of FIG. 24.
Figure 26:
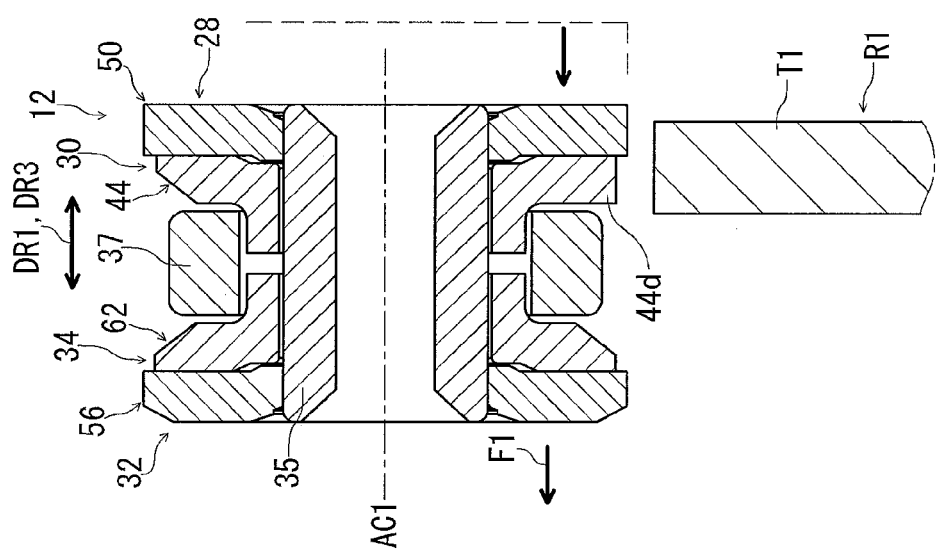
FIG. 26 is a partial cross sectional view of the bicycle sprocket with the bicycle chain at a released position at which a part of the bicycle chain is released from the bicycle sprocket toward a front crankset.

With the bicycle chain 12 illustrated in FIGS. 24 to 26, however, since the first chamfer-free angular range Y1 is equal to or greater than 30 degree, the first chamfer-free section 44d of the first end portion 44 slides with the edge of the tooth T1 at the released position instead of the first chamfered section 44c. Thus, the edge of the tooth T1 is less likely to snap with the bicycle chain 12, reducing the undesirable noise from the engaging part of the bicycle chain 12 and the bicycle sprocket 18 during the pedaling.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first end portion", "second end portion", "third end portion" or the like recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle chain comprising:
   a first inner link plate comprising:
      a first end portion including:
         a first opening having a first center axis;
         a first chamfered section extending along an outer periphery of the first end portion; and
         a first chamfer-free section free from being chamfered, the first chamfer-free section extending along the outer periphery of the first end portion from a first circumferential end of the first chamfered section, the first chamfer-free section being provided in at least a first chamfer-free angular range when viewed from an axial direction parallel to the first center axis;
a second end portion including a second opening having a second center axis;
the first chamfer-free angular range being defined from the first circumferential end of the first chamfered section to a first inner-link longitudinal centerline of the first inner link plate, the first inner-link longitudinal centerline being perpendicular to the first center axis and the second center axis when viewed from the axial direction, the first chamfer-free angular range being equal to or greater than 30 degrees with respect to the first center axis; and
a first intermediate portion interconnecting the first end portion and the second end portion.

2. The bicycle chain according to claim 1, wherein the first chamfer-free angular range is equal to or greater than 45 degrees with respect to the first center axis.

3. The bicycle chain according to claim 2, wherein the first chamfer-free angular range is equal to or greater than 60 degrees with respect to the first center axis.

4. The bicycle chain according to claim 1, wherein the first chamfered section is provided in at least a first chamfer angular range when viewed from the axial direction,
the first chamfer angular range is defined from the first circumferential end of the first chamfered section to a first perpendicular axis perpendicular to the first inner-link longitudinal centerline and the first center axis when viewed from the axial direction, and
the first chamfer angular range is equal to or greater than 20 degrees with respect to the first center axis.

5. The bicycle chain according to claim 4, wherein the first chamfer angular range is equal to or smaller than 30 degrees with respect to the first center axis.

6. The bicycle chain according to claim 1, wherein the second end portion includes
a second chamfered section extending along an outer periphery of the second end portion, and
a second chamfer-free section free from being chamfered, the second chamfer-free section extending along the outer periphery of the second end portion from a second circumferential end of the second chamfered section,
the second chamfer-free section is provided in at least a second chamfer-free angular range when viewed from the axial direction,
the second chamfer-free angular range is defined from the second circumferential end of the second chamfered section to the first inner-link longitudinal centerline when viewed from the axial direction, and
the second chamfer-free angular range is equal to or greater than 30 degrees with respect to the second center axis.

7. The bicycle chain according to claim 6, wherein the first chamfer-free angular range is defined on a first side of the first inner link plate with respect to the first inner-link longitudinal centerline,
the second chamfer-free angular range is defined on a second side of the first inner link plate with respect to the first inner-link longitudinal centerline, and
the second side is opposite to the first side with respect to the first inner-link longitudinal centerline.

8. The bicycle chain according to claim 7, wherein the second chamfer-free angular range is equal to or greater than 45 degrees with respect to the second center axis.

9. The bicycle chain according to claim 8, wherein the second chamfer-free angular range is equal to or greater than 60 degrees with respect to the second center axis.

10. The bicycle chain according to claim 6, wherein the second chamfered section is provided in at least a second chamfer angular range when viewed from the axial direction,
the second chamfer angular range is defined from the second circumferential end of the second chamfered section to a second perpendicular axis perpendicular to the first inner-link longitudinal centerline and the second center axis when viewed from the axial direction, and
the second chamfer angular range is equal to or greater than 20 degrees with respect to the second center axis.

11. The bicycle chain according to claim 10, wherein the second chamfer angular range is equal to or smaller than 30 degrees with respect to the second center axis.

12. The bicycle chain according to claim 1, wherein the first end portion includes a third chamfered section extending along the outer periphery of the first end portion and provided on an opposite side of the first chamfered section with respect to the first inner-link longitudinal centerline,
the first chamfer-free section extends along the outer periphery of the first end portion from the first circumferential end of the first chamfered section to a third circumferential end of the third chamfer chamfered section,
the first chamfer-free section is provided in at least a third chamfer-free angular range when viewed from the axial direction, and
the third chamfer-free angular range is defined from the third circumferential end of the third chamfered section to the first inner-link longitudinal centerline when viewed from the axial direction.

13. The bicycle chain according to claim 12, wherein the third chamfer-free angular range has an angle smaller than an angle of the first chamfer-free angular range.

14. The bicycle chain according to claim 12, wherein the second end portion includes
a second chamfered section extending along an outer periphery of the second end portion, and
a second chamfer-free section free from being chamfered, the second chamfer-free section extending along the outer periphery of the second end portion from a second circumferential end of the second chamfer chamfered section,
the second chamfer-free section is provided in at least a second chamfer-free angular range when viewed from the axial direction,
the second chamfer-free angular range defined from the second circumferential end of the second chamfer to the first inner-link longitudinal centerline when viewed from the axial direction, and
the second chamfer-free angular range is equal to or greater than 30 degrees with respect to the second center axis.

15. The bicycle chain according to claim 14, wherein the second end portion includes a fourth chamfered section extending along the outer periphery of the second end portion and provided on an opposite side of the second chamfered section with respect to the first inner-link longitudinal centerline,
the second chamfer-free section extends along the outer periphery of the second end portion from the second circumferential end of the second chamfered section to a fourth circumferential end of the fourth chamfered section, the second chamfer-free section is provided in at least a fourth chamfer-free angular range when viewed from the axial direction, and
the fourth chamfer-free angular range is defined from the fourth circumferential end of the fourth chamfered section to the first inner-link longitudinal centerline when viewed from the axial direction.

16. The bicycle chain according to claim 15, wherein the fourth chamfer-free angular range has an angle smaller than an angle of the second chamfer-free angular range.

17. The bicycle chain according to claim 15, wherein the first chamfer-free angular range and the fourth chamfer-free angular range are defined on a first side of the first inner link plate with respect to the first inner-link longitudinal centerline,
the second chamfer-free angular range and the third chamfer-free angular range are defined on a second side of the first inner link plate, and
the second side is opposite to the first side with respect to the first inner-link longitudinal centerline.

18. The bicycle chain according to claim 1, further comprising:
a second inner link plate spaced apart from the first inner link plate in the axial direction, wherein
the first inner link plate includes a first surface configured to face the second inner link plate and a second surface opposite to the first surface,
the first chamfered section and the first chamfer-free section are provided on the first surface, and
the second surface is configured to face a bicycle frame in a state where the bicycle chain engages with a bicycle sprocket.

19. The bicycle chain according to claim 18, further comprising:
a first outer link plate;
a second outer link plate spaced apart from the first outer link plate in the axial direction; and
a first link pin configured to rotatably couple the first inner link plate to the first outer link plate and configured to rotatably couple the second inner link plate to the second outer link plate, wherein
the first inner link plate is provided between the first outer link plate and the second inner link plate in the axial direction,
the second inner link plate is provided between the first inner link plate and the second outer link plate in the axial direction, and
the first outer link plate and the first inner link plate are configured to be positioned closer to a bicycle frame than the second outer link plate and the second inner link plate respectively in a state where the bicycle chain engages with the bicycle sprocket.

20. The bicycle chain according to claim 19, wherein the first end portion of the first inner link plate is positioned downstream of the second end portion of the first inner link plate with respect to a chain driving direction in a state where the bicycle chain engages with the bicycle sprocket.

21. The bicycle chain according to claim 20, wherein the first inner link plate has a first side and a second side opposite to the first side with respect to the first inner-link longitudinal centerline,
the first chamfer-free angular range is defined on the first side, and
the first side is provided closer to a rotation axis of the bicycle sprocket than the second side in a state where the bicycle chain engages with the bicycle sprocket.

22. A bicycle chain comprising:
a first inner link plate comprising:
a first end portion including:
a first opening having a first center axis;
a first chamfered section extending along an outer periphery of the first end portion; and
a first chamfer-free section free from being chamfered, the first chamfer-free section extending along the outer periphery of the first end portion from a first circumferential end of the first chamfered section, the first chamfer-free section being provided in at least a first chamfer-free angular range when viewed from an axial direction parallel to the first center axis, the first chamfer-free angular range being defined from the first circumferential end of the first chamfered section to a first inner-link longitudinal centerline of the first inner link plate;
a second end portion including:
a second opening having a second center axis;
a second chamfered section free from being chamfered, the second chamfer-free section extending along an outer periphery of the second end portion from a second circumferential end of the second chamfered section, the second chamfer-free section being provided in at least a second chamfer-free angular range when viewed from the axial direction; and
the second chamfer-free angular range being defined from the second circumferential end of the second chamfered section to the first inner-link longitudinal centerline when viewed from the axial direction, the first inner-link longitudinal centerline being perpendicular to the first center axis and the second center axis when viewed from the axial direction; and
a first intermediate portion interconnecting the first end portion and the second end portion, wherein
the first end portion further includes a third chamfered section extending along the outer periphery of the first end portion and provided on an opposite side of the first chamfered section with respect to the first inner-link longitudinal centerline,
the first chamfer-free section extends along the outer periphery of the first end portion from the first circumferential end of the first chamfered section to a third circumferential end of the third chamfered section,
the first chamfer-free section is provided in at least a third chamfer-free angular range when viewed from the axial direction, the third chamfer-free angular range is defined from the third circumferential end of the third chamfered section to the first inner-link longitudinal centerline when viewed from the axial direction, and
the third chamfer-free angular range has an angle different from an angle of the first chamfer-free angular range.

23. The bicycle chain according to claim 22, wherein the third chamfer-free angular range has an angle smaller than an angle of the first chamfer-free angular range.

24. The bicycle chain according to claim 22, wherein the second end portion further includes a fourth chamfered section extending along the outer periphery of the second end portion and provided on an opposite side of the second chamfered section with respect to the first inner-link longitudinal centerline,
the second chamfer-free section extends along the outer periphery of the second end portion from the second circumferential end of the second chamfered section to a fourth circumferential end of the fourth chamfered section, the second chamfer-free section is provided in at least a fourth chamfer-free angular range when viewed from the axial direction, the fourth chamfer-free angular range is defined from the fourth circumferential end of the fourth chamfered section to the first inner-link longitudinal centerline when viewed from the axial direction, and the fourth chamfer-free angular range has an angle different from an angle of the second chamfer-free angular range.

25. The bicycle chain according to claim 24, wherein the fourth chamfer-free angular range has an angle smaller than an angle of the second chamfer-free angular range.

\* \* \* \* \*